(12) United States Patent
Shimazaki et al.

(10) Patent No.: US 8,215,663 B2
(45) Date of Patent: Jul. 10, 2012

(54) AIRBAG DEVICE

(75) Inventors: Yoshio Shimazaki, Ibaragi (JP); Kou Sasaki, Toyonaka (JP)

(73) Assignee: Ashimori Industry Co., Ltd., Osaka (JP)

( * ) Notice: Subject to any disclaimer, the term of this patent is extended or adjusted under 35 U.S.C. 154(b) by 114 days.

(21) Appl. No.: 12/673,398

(22) PCT Filed: Jul. 1, 2008

(86) PCT No.: PCT/JP2008/061899
§ 371 (c)(1),
(2), (4) Date: Apr. 28, 2010

(87) PCT Pub. No.: WO2009/022500
PCT Pub. Date: Feb. 19, 2009

(65) Prior Publication Data
US 2010/0295271 A1    Nov. 25, 2010

(30) Foreign Application Priority Data
Aug. 13, 2007    (JP) ................................. 2007-210738

(51) Int. Cl.
*B60R 21/203* (2006.01)
*B60R 21/2346* (2011.01)
*B60R 21/261* (2011.01)

(52) U.S. Cl. ..................... 280/728.2; 280/731; 280/740; 280/742

(58) Field of Classification Search ............... 280/728.2, 280/731, 736, 740, 742, 743.1, 743.2
See application file for complete search history.

(56) References Cited

U.S. PATENT DOCUMENTS

| 5,174,601 | A | * | 12/1992 | Frantz et al. | .................. 280/740 |
| 5,207,450 | A | * | 5/1993 | Pack et al. | ...................... 280/738 |
| 5,226,671 | A | * | 7/1993 | Hill | ............................. 280/743.1 |
| 5,249,824 | A | * | 10/1993 | Swann et al. | ................. 280/729 |
| 6,209,911 | B1 | * | 4/2001 | Igawa et al. | .................... 280/740 |

(Continued)

FOREIGN PATENT DOCUMENTS
CN        1765662 A    5/2006
(Continued)

OTHER PUBLICATIONS

European Search Report corresponding to European Patent Application No. 08777750.4, dated Mar. 14, 2011.

(Continued)

*Primary Examiner* — Paul N Dickson
*Assistant Examiner* — Laura Freedman
(74) *Attorney, Agent, or Firm* — Sughrue Mion, PLLC

(57) ABSTRACT

The operation efficiency is improved by enabling a gas rectifying member of an airbag device to be easily disposed in a folded airbag. An airbag in a folded state is accommodated around an inflator of an airbag device, and a gas rectifying member (12) for guiding gas is disposed between the airbag and the inflator surrounded by the airbag. The gas rectifying member (12) includes a retained portion (12A) retained, together with the airbag, around the inflator and a free-standing tubular gas-flow guide portion (12B) standing upright from the retained portion (12A), which are formed as a single part from a base fabric. The airbag is folded in a state in which the retained portion (12A) is retained inside the airbag. At this time, the gas-flow guide portion (12B) is less likely to be sandwiched between the airbag, because it is standing in the airbag.

14 Claims, 12 Drawing Sheets

U.S. PATENT DOCUMENTS

| | | |
|---|---|---|
| 6,382,662 B1 | 5/2002 | Igawa |
| 6,612,609 B1 * | 9/2003 | Rodriguez et al. ............ 280/729 |
| 6,834,884 B2 * | 12/2004 | Gu ................................ 280/729 |
| 6,854,760 B2 * | 2/2005 | Whited et al. ................. 280/732 |
| 7,441,802 B2 * | 10/2008 | Yamaji et al. ................. 280/739 |
| 7,637,528 B2 * | 12/2009 | Shimazaki et al. ........ 280/728.2 |
| 7,651,119 B2 * | 1/2010 | Lee ............................ 280/728.2 |
| 7,749,147 B2 * | 7/2010 | Teramura et al. ............. 493/458 |
| 7,832,761 B2 * | 11/2010 | Shimazaki et al. ........... 280/731 |
| 7,854,446 B2 * | 12/2010 | Nakamura et al. ........ 280/728.2 |
| 7,878,533 B2 * | 2/2011 | Shimazaki et al. ........... 280/731 |
| 2002/0038949 A1 | 4/2002 | Okada et al. |
| 2006/0091662 A1 | 5/2006 | Tsujimoto et al. |
| 2006/0232049 A1 * | 10/2006 | Abe ............................. 280/729 |
| 2007/0222194 A1 * | 9/2007 | Harvey et al. ................. 280/740 |
| 2009/0218799 A1 * | 9/2009 | Taniyama et al. .......... 280/743.2 |
| 2009/0283997 A1 * | 11/2009 | Teramura et al. .......... 280/743.1 |

FOREIGN PATENT DOCUMENTS

| | | |
|---|---|---|
| EP | 1 889 757 A1 | 2/2008 |
| JP | 2000-085511 A | 3/2000 |
| JP | 2001-080440 A | 3/2001 |
| JP | 2002-053000 A | 2/2002 |
| JP | 2004-231042 A | 8/2004 |
| JP | 2006-341716 A | 12/2006 |
| WO | 2007007461 A1 | 1/2007 |

OTHER PUBLICATIONS

Chinese Office Action corresponding to Patent Application No. 200880102681.5, dated Apr. 21, 2011.

* cited by examiner

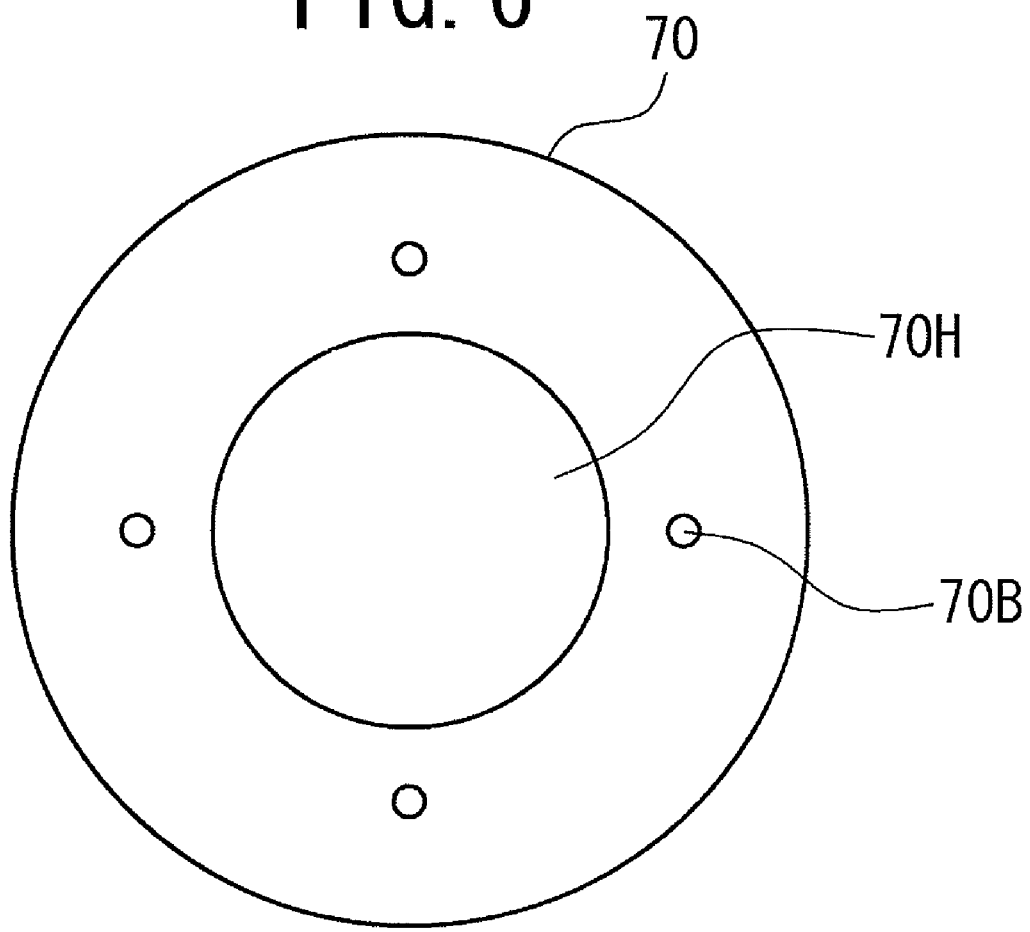

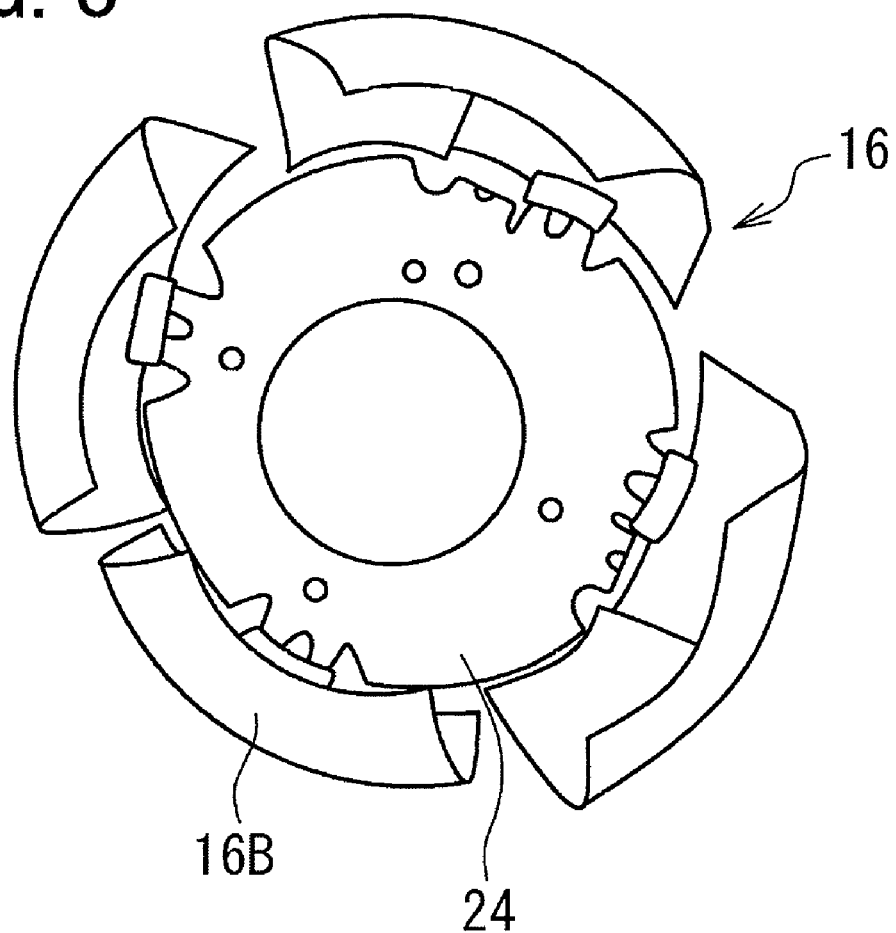

AIRBAG DEVICE

CROSS REFERENCE TO RELATED APPLICATIONS

This application is a National Stage of International Application No. PCT/JP2008/061899 filed Jul. 1, 2008 claiming priority based on Japanese Patent Application No. 2007-210738 filed Aug. 13, 2007, the contents of all of which are incorporated herein by reference in their entirety.

TECHNICAL FIELD

The present invention relates to airbag devices installed in cars or the like, and, more specifically, it relates to airbag devices having a gas rectifying member that controls the flow of gas generated by an inflator during deployment of an airbag.

BACKGROUND ART

In recent years, cars equipped with airbag devices installed in, for example, the steering wheel and the instrument panel are widely used to protect occupants in the driver's seat and the passenger seat during a vehicle collision, an emergency situation, or the like. Such an airbag device, upon detection of a vehicle collision or in a similar situation, activates an inflator to supply gas into an airbag to inflate and deploy the airbag. Thus, the occupant's head or the like, moving toward the front of the vehicle, is received and restrained by the inflated and deployed airbag so as to be protected from the collision impact or the like.

As an example of such an airbag device, an airbag device having a gas rectifying member that controls and rectifies the flow of gas generated by an inflator and guides the gas to a predetermined position in the airbag is conventionally known (see Patent Document 1).

FIG. 15 is a cross sectional view schematically showing the structure of the conventional airbag device.

As shown in the figure, the airbag device 100 includes an airbag cover 116, an ornamental member 140 disposed on the occupant side thereof (the left side in the figure), an inflator 130 and an airbag 110 that are disposed in the airbag cover 116, and the like. The airbag device 100 is installed into, for example, the central portion of the steering wheel (not shown) of a vehicle.

The airbag cover 116 has a substantially bowl shape that can be split in conjunction with inflation and deployment of the airbag 110. The ornamental member 140 is disposed in a recess 116A formed on the occupant side. Between a base plate 124 attached on the other side (the right side in the figure) and the airbag cover 116 are accommodated a part of the inflator 130, the airbag 110, and the like. The inflator 130 is fitted to a hole (an opening) formed substantially at the center of the base plate 124 and is fixed to the base plate 124 in such a manner that one side thereof, having a plurality of gas discharge ports 130A, is inserted into the airbag cover 116.

The airbag 110 has an attachment hole for the inflator 130 and is disposed on the outside (outer peripheral side) of the inflator 130 attached thereto, in a folded state such that it can be inflated by the gas from the inflator 130. The periphery of the attachment hole of the airbag 110, disposed in this manner, is sandwiched between a cushion ring 122 inserted therein and the base plate 124 and is retained. Thus, the airbag 110 is fixed so as to cover the inflator 130. Furthermore, the airbag 110 includes a substantially bag-shaped airbag body 110A that is inflatable and deployable and a substantially tubular tether belt 110B that controls, for example, the extension length of the airbag body 110A (hereinafter, a "tubular tether belt"). The airbag 110, which is sequentially folded in an accordion shape toward the occupant side (toward the left in the figure), is accommodated in the airbag cover 116.

In this state, the airbag 110 is substantially entirely covered with the holding member 114, except for a portion near the inflator 130, so as to be wrapped from the outer surface side. A gas rectifying member 112 is disposed on the inner surface side between the airbag 110 and the inflator 130. The gas rectifying member 112 rectifies gas generated by the inflator 130 during inflation and deployment of the airbag 110, adjusts the outflow direction thereof in a predetermined direction, and guides the gas inside the airbag 110. At the same time, the gas rectifying member 112 also functions as an airbag protection member that protects the airbag 110 from the gas. The gas rectifying member 112 of the airbag device 100 rectifies the gas generated by, for example, the inflator 130 and guides the gas to the vicinity of a portion to be inflated at the initial stage of deployment of the airbag 110. Thus, the deployment characteristics of the airbag 110 are improved to enhance the occupant protection function.

Herein, in the conventional airbag device 100, the gas rectifying member 112 is formed in a disc shape (circular shape) having a hole substantially at the center, to which the inflator 130 can be inserted. The gas rectifying member 112 is disposed inside the airbag 110 so as to be concentric with the outer periphery of the above-described inflator attachment hole, and is attached to the airbag 110 through the cushion ring 122. Accordingly, the gas rectifying member 112, together with the airbag 110, is retained between the base plate 124 and the cushion ring 122 and is fixed, and an outside portion extending from the retained portion (a gas-flow guide portion) is disposed so as to extend along the inner surface (inner periphery) of the folded airbag 110.

Furthermore, the gas rectifying member 112 is already attached to the inside of the airbag 110 when the airbag 110 is folded in the above-described manner and, thus, is mounted to a folding device together with the airbag 110. The folding device for folding the airbag 110 retains the airbag 110 and the gas rectifying member 112 at a predetermined position using the cushion ring 122 and stretches the airbag body 110A and the tubular tether belt 110B upward so that they have a substantially tubular shape as a whole. From that state, the airbag 110 and the gas rectifying member 112 are pushed downward to be folded.

After the airbag 110 is folded vertically in an accordion shape and is compressed to a predetermined state by, for example, compressing the respective portions thereof downward in a folded manner, the airbag 110 is entirely covered with the holding member 114 and is securely held so that its folded shape is not destroyed. Then, the gas rectifying member 112 in the airbag 110 is disposed at a predetermined position in the airbag 110, as described above, completing the folding operation of the airbag 110.

This conventional airbag device 100 has, however, a tendency that, when the airbag 110 is folded, the gas rectifying member 112 is tucked between the folded portions of the airbag 110 and is folded in an accordion shape with the airbag 110, and substantially the entirety thereof is tucked into the airbag 110. Therefore, when the gas rectifying member 112 is disposed in the above-described manner, substantially the entirety of the gas rectifying member 112, sandwiched between the airbag 110, needs to be pulled out from between the airbag 110. At the same time, because the airbag 110, covered with the holding member 114, is held in a compressed state, the gas rectifying member 112 is relatively tightly sandwiched between the airbag 110. This makes the above-described pulling-out operation very difficult.

As has been described above, the conventional airbag device 100 has a problem in that the operation to dispose the gas rectifying member 112 in the airbag 110 is complicated and requires significant effort, manpower, time, and the like, thereby lowering the operation efficiency. In conjunction with this, the assembly operation of the airbag device 100 becomes difficult, and the operation efficiency thereof tends to be lowered.

Patent Document 1: Japanese Unexamined Patent Application Publication No. 2006-341716

DISCLOSURE OF INVENTION

Problems to be Solved by Invention

The present invention has been made in view of the above-described conventional problems, and an object thereof is to enable a gas rectifying member of an airbag device to be easily disposed in a folded airbag, so as to ease the assembly operation of the airbag device and improve the operation efficiency thereof.

Means for Solving the Problems

A first aspect of the invention is an airbag device including an inflator; an airbag having an attachment hole for the inflator, the airbag being accommodated in a folded state around the inflator; a gas rectifying member that guides gas from the inflator, the gas rectifying member being disposed between the inflator and the accommodated airbag; a cushion ring disposed near the attachment hole inside the airbag; and a base plate for fixing the airbag, the base plate being disposed to oppose the cushion ring. The gas rectifying member includes a retained portion retained, together with the airbag, between the cushion ring and the base plate, and a free-standing tubular gas-flow guide portion standing upright from the retained portion. The retained portion and the gas-flow guide portion are formed as a single part from a base fabric.

A second aspect of the invention is characterized in that, in the airbag device according to the first aspect, the retained portion of the gas rectifying member is provided at the center of the base fabric, and the tubular gas-flow guide portion of the gas rectifying member is formed by connecting side edges of radial cutout portions provided on the outside of the retained portion.

A third aspect of the invention is characterized in that, in the airbag device according to the second aspect, the side edges of the cutout portions are connected by sewing.

A fourth aspect of the invention is characterized in that, in the airbag device according to any one of the first to third aspects, the gas rectifying member is formed such that the tubular gas-flow guide portion can expand to a larger size than the inner periphery of the airbag in a folded state.

A fifth aspect of the invention is characterized in that, in the airbag device according to any one of the first to fourth aspects, the base fabric constituting the gas rectifying member is a silicone coated base fabric.

A sixth aspect of the invention is characterized in that, in the airbag device according to any one of the first to fifth aspects, the gas rectifying member is formed such that the tubular gas-flow guide portion expands from one end at the retained portion toward the other end.

Advantages

The present invention enables the gas rectifying member of the airbag device to be easily disposed in the folded airbag, so as to ease the assembly operation of the airbag device and improve the operation efficiency thereof.

BRIEF DESCRIPTION OF DRAWINGS

FIG. 6 is a developed plan view showing a protection member, which is disposed between the cushion ring and attachment feet of the connecting member.

FIG. 8 is a front view of the airbag cover with covering pieces open, viewed from front (occupant side).

REFERENCE NUMERALS

1: airbag device, 10: airbag, 10A: airbag body, 10AH: inflator attachment hole, 10B: tubular tether belt, 10BH: attachment hole, 10C: sewn portion, 10D: sewn portion, 10H: cutaway portion, 10S: peripheral portion, 10T: small hole, 12: gas rectifying member, 12A: retained portion, 12B: gas-flow guide portion, 12BP: gas-flow guide portion piece, 12F: pleats, 12H: insertion hole, 12K: cutout portion, 12M: sewn portion, 12T: small hole, 14: holding member, 14A: attachment tab, 14AH: hole, 14B: attachment tab, 14BH: hole, 14H: planned cut portion, 14S: insertion hole, 16: airbag cover, 16A: recess, 16AH: hole, 16B: covering piece, 16C: attachment tab, 20: connecting member, 20A: central portion, 20B: leg portion, 20C: attachment foot, 20D: attachment hole, 20H: connecting hole, 22: cushion ring, 22A: through-hole, 22B: abutting surface, 22C: recess, 22D: bolt, 22H: insertion hole, 24: base plate, 24A: airbag cover attachment tab, 24B: fixing attachment tab, 24C: attachment hole, 24H: hole, 30: inflator, 30A: gas discharge ports, 40: ornamental member, 40A: attachment bolt, 50: steering wheel, 60: airbag folding device, 61: table, 62: supporting member, 63: outer cylinder, 64: sandwiching member, 65: plate, 70: protection member, 70B: small hole, 70H: insertion hole, and L1 to L4 and LC: tear line.

BEST MODE FOR CARRYING OUT THE INVENTION

An airbag device according to an embodiment of the present invention will be described below with reference to the drawings.

This airbag device is an airbag device for driver's seat, passenger seat, or the like and is attached to, for example, the steering wheel, the instrument panel, or the like of a car to protect the occupant. In the following embodiment, a description will be given taking an airbag device for driver's seat as an example.

Figure 1:
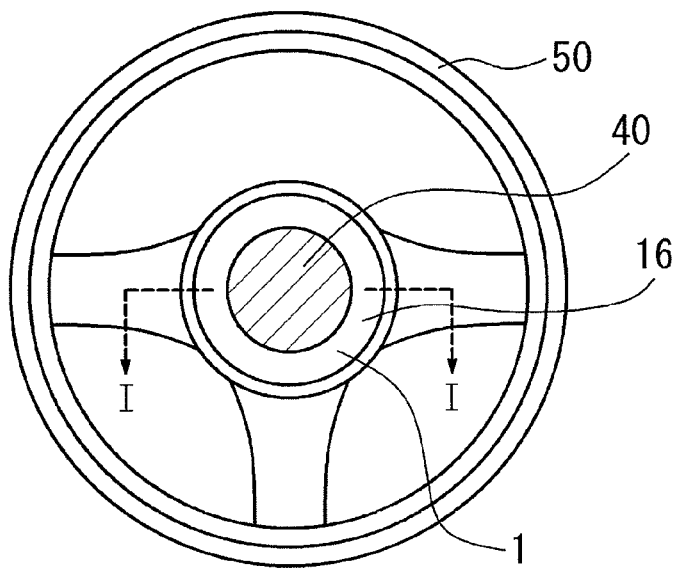
FIG. 1 is a front view showing a steering wheel equipped with an airbag device according to this embodiment.

FIG. 1 is a front view showing a steering wheel equipped with the airbag device according to this embodiment, in which a state viewed from the occupant side is schematically shown.

As shown in the figure, the airbag device 1 includes an airbag cover 16, an ornamental member 40 disposed on the occupant side thereof (in the figure, on the near side of the sheet of FIG. 1), and the like. The airbag device 1 is disposed on the occupant side of the steering wheel 50 and is incorporated into substantially the central portion thereof.

In the following description, for convenience's sake, the occupant side is referred to as the front side, and the opposite side is referred to as the back side. On the basis of them, respective portions of the device, mainly about their arrangement state etc., in the airbag device 1, will be described.

Figure 2:
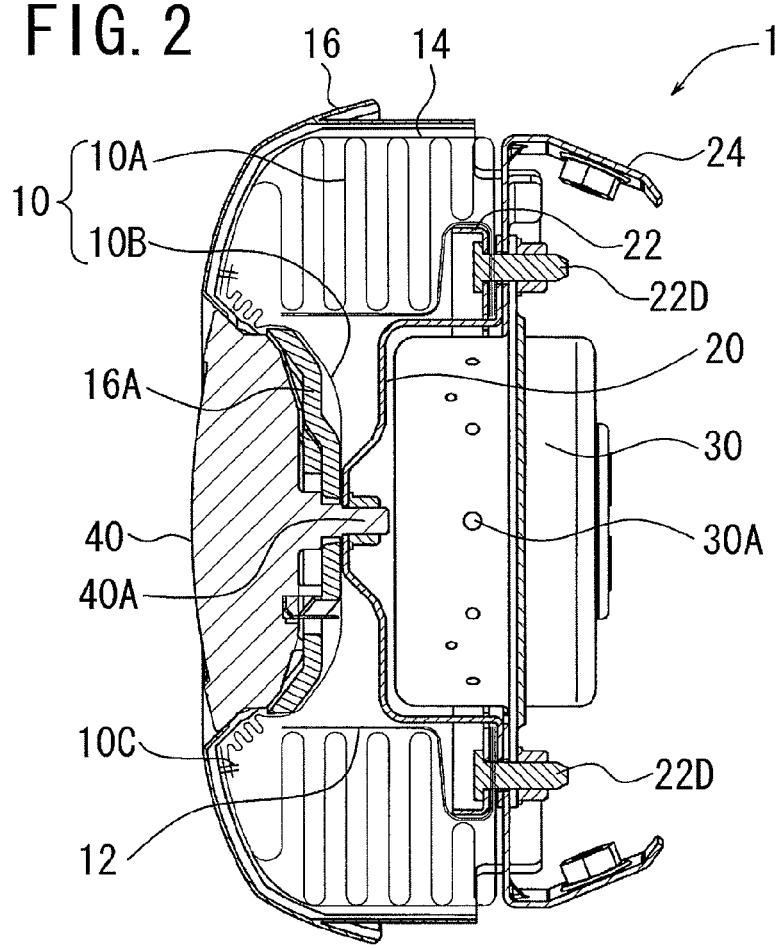
FIG. 2 is a cross sectional view of the airbag device according to this embodiment, taken along line I-I in FIG. 1 and viewed from the direction of arrows.

FIG. 2 is a cross sectional view of the airbag device 1, taken along line I-I in FIG. 1 and viewed from the direction of arrows, in which the relevant part is schematically shown.

Figure 15:
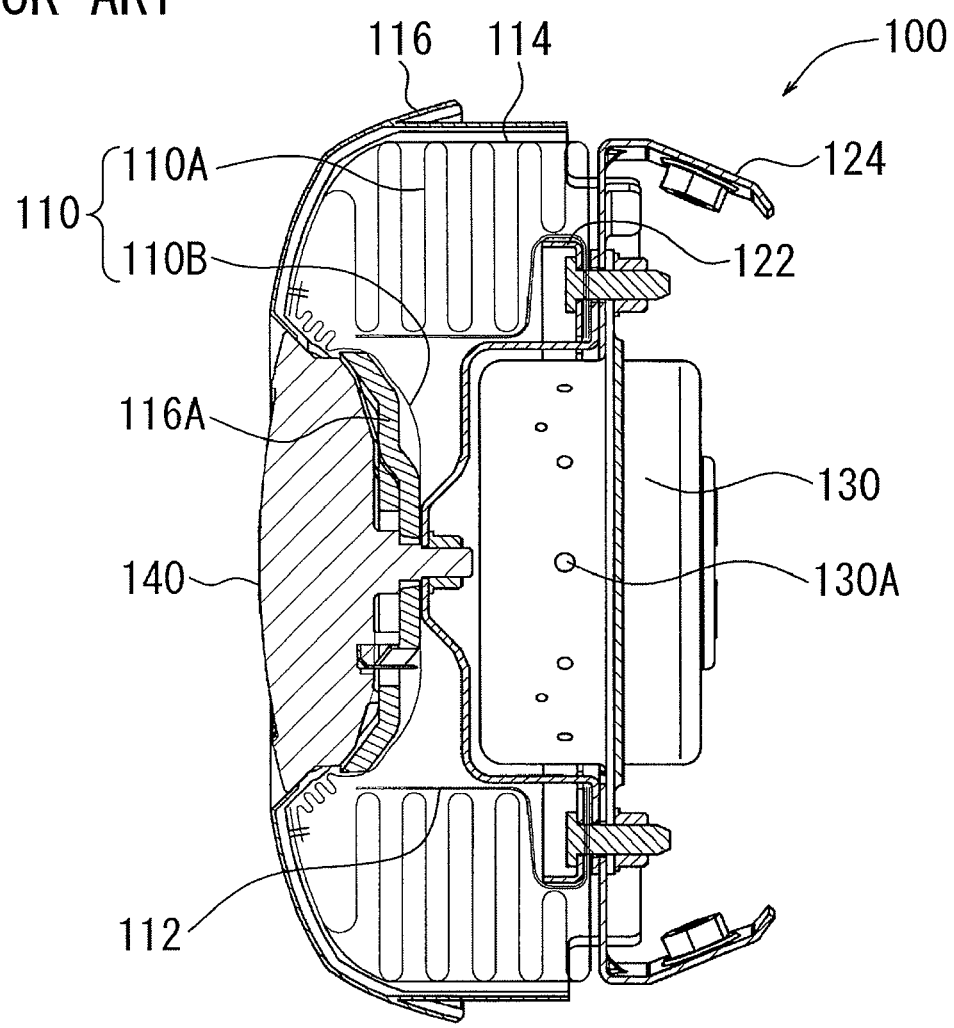
FIG. 15 is a cross sectional view schematically showing the structure of a conventional airbag device.

The airbag device 1 basically has the same structure as the above-described conventional airbag device 100 (see FIG. 15). As shown in the figure, the ornamental member 40 is disposed in a recess 16A formed on the front side (the left side in the figure) of the airbag cover 16, and an inflator 30, an airbag 10, etc., are disposed in the airbag cover 16 on the back side thereof.

The inflator 30 has a substantially thick disc shape and has a plurality of gas discharge ports 30A formed over the entirety thereof in the peripheral direction, in the outer periphery thereof on one side in the thickness direction (in the figure, in the substantially left half region of the outer peripheral surface). The inflator 30 is configured such that it can generate gas and discharge the gas into the airbag 10 from the gas discharge ports 30A, upon detection of a predetermined impact.

The airbag 10 has an attachment hole for the inflator 30 and is disposed in a folded state such that it can be inflated by the gas from the inflator 30, on the outside (outer periphery) including the outer peripheral side of the inflator 30. Furthermore, the airbag 10 includes a substantially bag-shaped airbag body 10A that is inflatable and deployable and a substantially tubular tether belt (tubular tether belt 10B) that controls the extension length of the airbag body 10A. The airbag body 10A and the tubular tether belt 10B, which are sewn together at a sewn portion 10C, are sequentially folded in an accordion shape toward, for example, the occupant side (toward the left in the figure) and are accommodated in the airbag cover 16.

The periphery of the attachment hole of the airbag 10, disposed in this manner, is sandwiched between a cushion ring 22, inserted therein (inside) and is disposed near the attachment hole, and a base plate 24 and is retained. Thus, the airbag 10 is fixed so as to cover the inflator 30. Furthermore, in this state, the airbag 10 is substantially entirely covered, except for a portion near the inflator 30, with the holding member 14 so as to be wrapped from the outer surface side. The gas rectifying member 12 is disposed on the inner surface side between the airbag 10 and the inflator 30.

The base plate 24 is disposed on the outside of the airbag 10 so as to face the cushion ring 22 and retains and fixes the holding member 14, the gas rectifying member 12, etc., in addition to the airbag 10 (airbag body 10A). Furthermore, the airbag cover 16 is fixed to the base plate 24 so as to cover the airbag 10 etc. A connecting member 20 is fixed by, for example, being sandwiched between the base plate 24 and the cushion ring 22. Accordingly, in this embodiment, the base plate 24 and the cushion ring 22 constitute retaining means (a retaining member) that retains these members and the vicinity of the attachment hole of the airbag 10. The respective portions of the airbag device 1 will be described one by one in more detail below.

Figure 3:
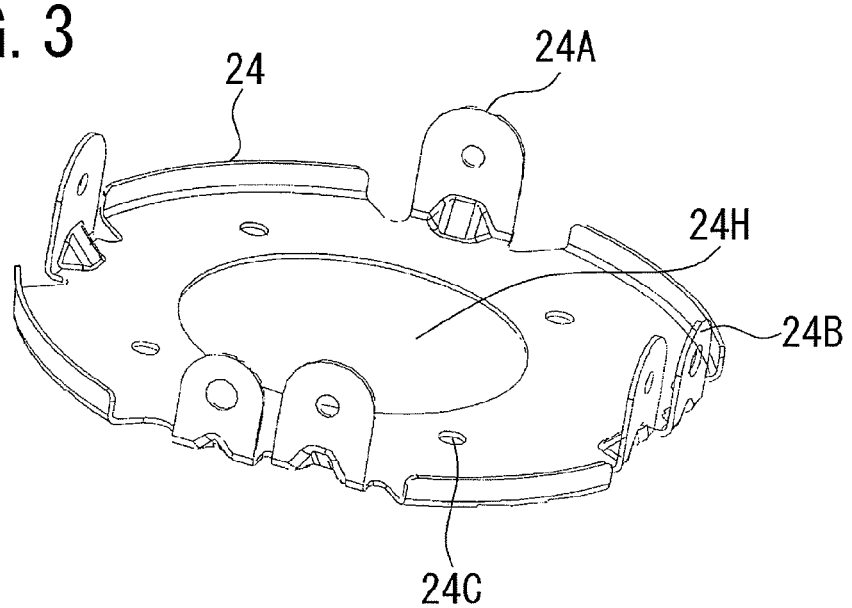
FIG. 3 is a perspective view of a base plate, viewed from back.

FIG. 3 is a perspective view of the base plate 24, viewed from back.

The base plate 24 is a plate-like member for integrally fixing the inflator 30, the airbag 10, the airbag cover 16, the ornamental member 40, etc., and, as shown in the figure, has a substantially disc shape as a whole. Furthermore, the base plate 24 has, along the outer peripheral edge thereof, four airbag cover attachment tabs 24A to which the airbag cover 16 is fixed, and a pair of fixing attachment tabs 24B by which the base plate 24 itself is attached to the steering wheel 50. These attachment tabs 24A and 24B are formed at predetermined positions by cutting the disc surface and bending the cut portions upward so as to protrude toward the back side. In addition, herein, the base plate 24 has a substantially circular hole 24H formed at the center thereof, to which the inflator 30 can be fitted, and four circular holes (attachment holes) 24C formed on the outside thereof, substantially at equal intervals in the peripheral direction.

The inflator 30 (see FIG. 2) penetrates through the central hole 24H in the base plate 24 and is disposed such that the one side thereof in the thickness direction, having the above-described gas discharge ports 30A, is positioned on the front side of the base plate 24. Furthermore, the inflator 30 has a flange portion on the outer peripheral surface of the intermediate portion in the thickness direction, which comes into tight contact with the back surface (the right side surface in FIG. 2) of the base plate 24 and is fixed by the cushion ring 22 through the four attachment holes 24C in the base plate 24. Accordingly, the inflator 30 is fixed to the base plate 24 such that the portion having the gas discharge ports 30A projects toward the front side of the base plate 24, and discharges gas from the gas discharge ports 30A into the airbag 10, on the front side of the base plate 24.

Figure 4:
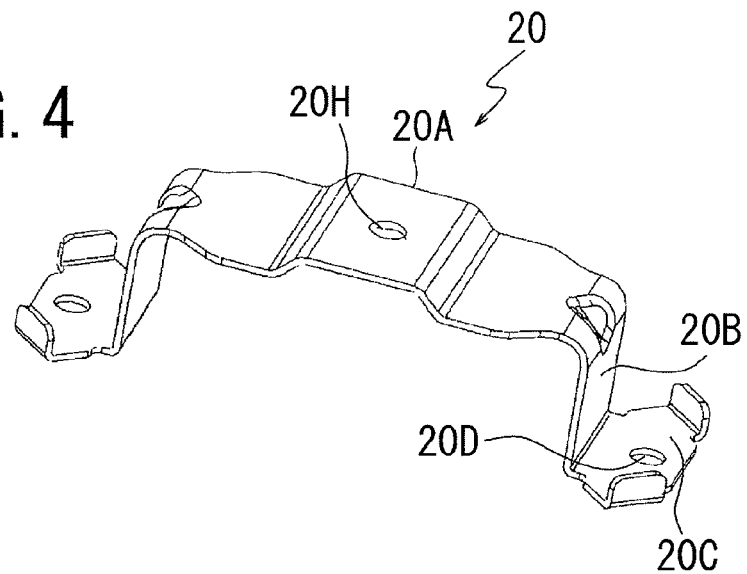
FIG. 4 is a perspective view of a connecting member, viewed from front.

FIG. 4 is a perspective view of the connecting member 20 shown in FIG. 2, viewed from front.

The connecting member 20 is a three-dimensional metal piece for connecting the ornamental member 40 etc., and, as shown in the figure, includes a central portion 20A having a substantially elongated plate shape, which is disposed along the front side of the inflator 30 (see FIG. 2), a pair of leg portions 20B formed by bending both ends, in the longitudinal direction, of the central portion 20A substantially at right angles, and attachment feet 20C formed by bending the ends of the leg portions 20B substantially at right angles toward the outside. Furthermore, the connecting member 20 has attachment holes 20D corresponding to the attachment holes 24C (see FIG. 3) in the base plate 24 and bolts 22D of the cushion ring 22 (described below, see FIG. 2), substantially at the centers of the attachment feet 20C. The connecting member 20 is fixed to the front side of the base plate 24 by, for example, being screwed by the bolts 22D of the cushion ring 22.

The connecting member 20, in a state of being fixed to the base plate 24 (see FIG. 2), is disposed so as to bridge over the inflator 30 with a predetermined distance between itself and the outer surface of the inflator 30, such that the inflator 30 projecting toward the front side of the base plate 24 is surrounded by the central portion 20A and the pair of leg portions 20B. In addition, the intermediate region of the central portion 20A of the connecting member 20 is protruded so as to be abutted against the back surface of the recess 16A in the airbag cover 16. The abutting surface has a connecting hole 20H at substantially the center thereof, into which an attachment bolt 40A fixed so as to project from the center of the back surface of the ornamental member 40 can be inserted. Note that the ornamental member 40, together with the recess 16A of the airbag cover 16, is fixed to the connecting member 20 by inserting the attachment bolt 40A into the connecting hole 20H in the connecting member 20 through the hole formed in the recess 16A in the airbag cover 16, and by screwing a nut thereonto from the back side thereof.

Figure 5A:
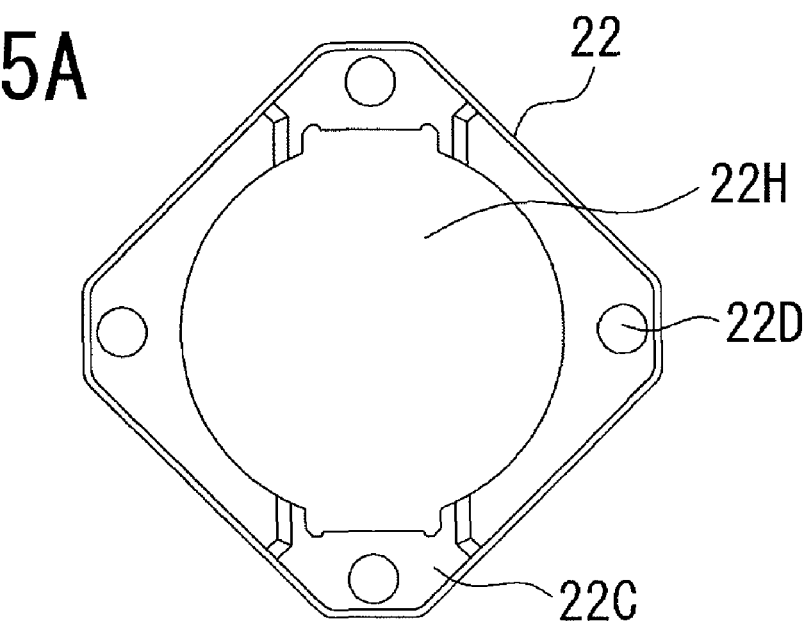
FIG. 5 is a schematic view showing a cushion ring.
Figure 5B:
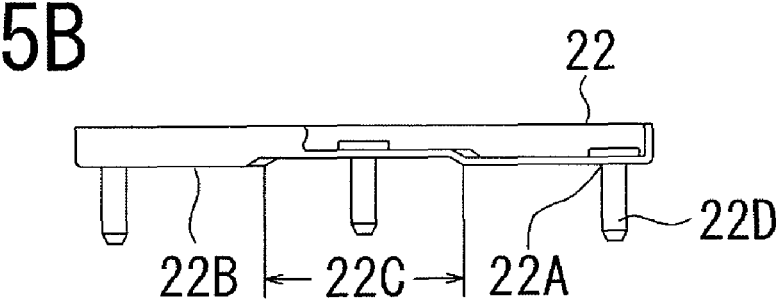

FIG. 5 is a schematic view of the cushion ring 22 shown in FIG. 2, in which FIG. 5A is a front view of the cushion ring 22, viewed from front in FIG. 2, and FIG. 5B is a side view of the cushion ring 22, shown partially in cross section.

As shown in the figure, the cushion ring 22 has a substantially rectangular shape in front view (see FIG. 5A) and has an insertion hole 22H formed at the center thereof, into which the inflator 30 can be inserted, and through-holes 22A (see FIG. 5B) formed at four corners around the insertion hole 22H. The through-holes 22A in the cushion ring 22 are formed at positions corresponding to the attachment holes 24C in the base plate 24. In addition, the bolts 22D for attaching the cushion ring 22 to the base plate 24 are inserted into the through-holes 22A from the front side to the back side (in FIG. 5B, from above to below) and are fixed.

Furthermore, the back surface (in FIG. 5B, the lower surface) of the cushion ring 22 constitutes an abutting surface 22B that can be abutted against the front surface of the base plate 24 with the airbag 10 and the like therebetween, and has recesses 22C formed by, for example, drawing at the corners including the peripheries of the pair of through-holes 22A positioned diagonal to each other. These recesses 22C are formed to have a depth that is substantially equal to the thickness of the attachment feet 20C, such that the attachment feet 20C of the connecting member 20 are accommodated therein, when the bolts 22D provided at the recesses 22C are inserted into the attachment holes 20D in the connecting member 20 (see FIG. 4) from the back side with the airbag 10 therebetween to connect the cushion ring 22 and the connecting member 20.

FIG. 6 is a developed plan view showing a protection member 70 disposed between the cushion ring 22 and the attachment feet 20C of the connecting member 20.

When the cushion ring 22 and the connecting member 20 are connected and fixed, the protection member 70 is disposed between the airbag 10 and the attachment feet 20C of the connecting member 20 to prevent the airbag 10 in the vicinity thereof from being damaged by the edge or the like of the connecting member 20 and to protect the airbag 10. The protection member 70 is formed of, for example, a woven base fabric with a surface thereof being coated with silicone rubber.

Furthermore, the protection member 70 has a substantially circular shape and has an insertion hole 70H formed at the center thereof, into which the inflator 30 can be inserted, and four small holes 70B formed on the outside thereof, in the peripheral direction, into which the bolts 22D of the cushion ring 22 are inserted. That is, when the insertion hole 70H in the protection member 70 and the insertion hole 22H in the cushion ring 22 are disposed substantially concentrically with each other, the bolts 22D of the cushion ring 22 can be inserted into the small holes 70B. The protection member 70 is disposed on the back side of the cushion ring 22 before the connecting member 20 is disposed.

Figure 7A:
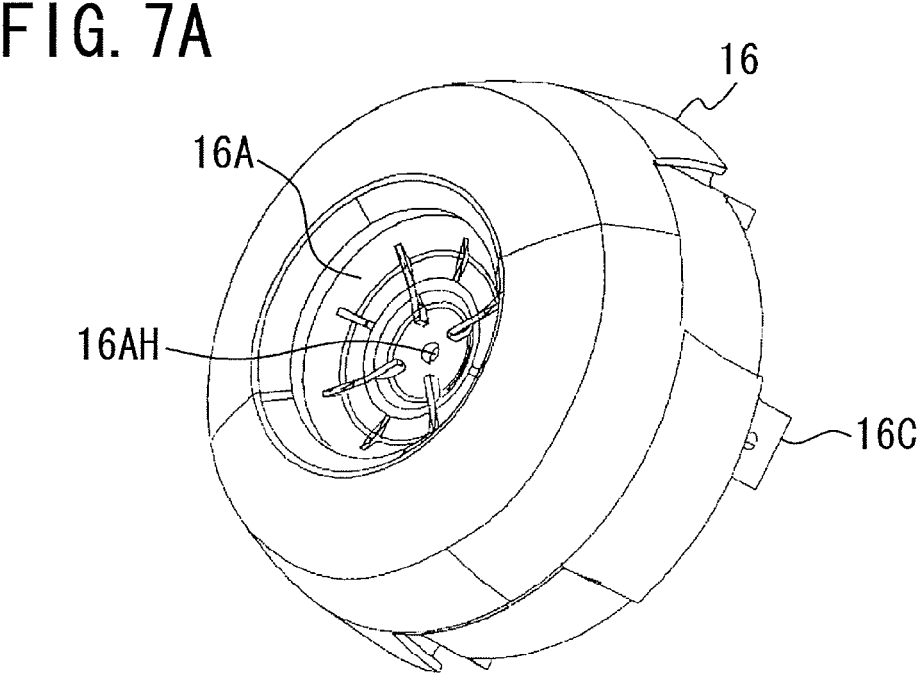
FIG. 7 is a schematic view showing an airbag cover.
Figure 7B:
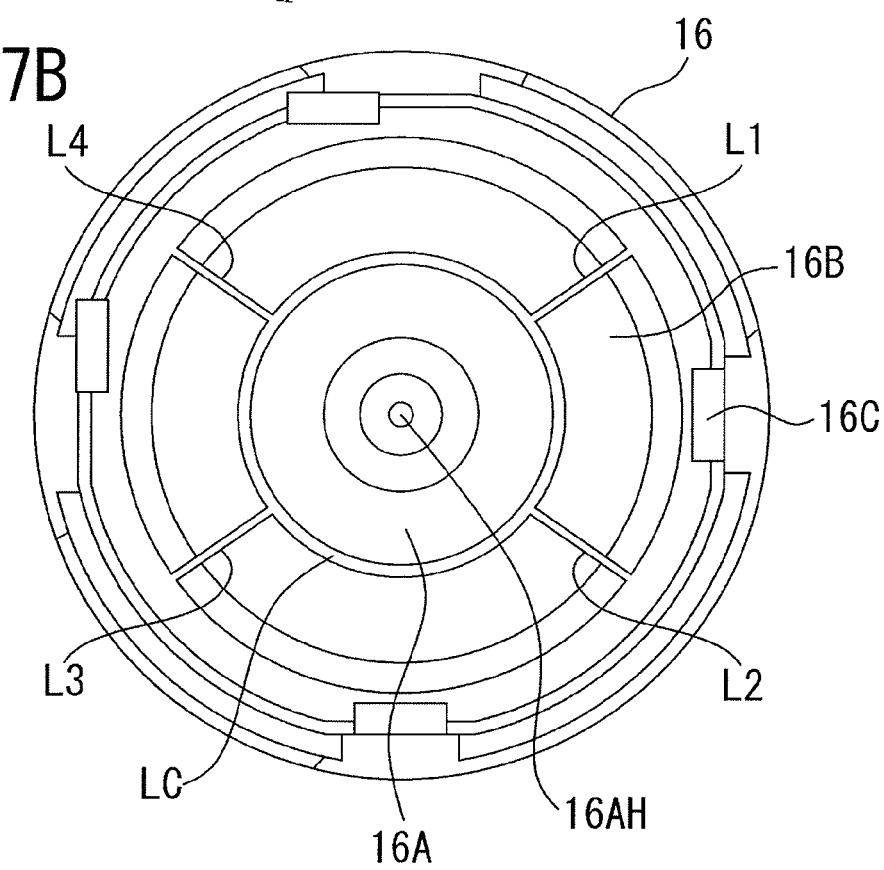

FIG. 7 is a schematic view showing the airbag cover 16 disposed so as to cover the above-described respective members (see FIG. 2), in which FIG. 7A is a perspective view of the airbag cover 16, viewed from front, and FIG. 7B is a plan view of the airbag cover 16, viewed from back.

The airbag cover 16 is composed of, for example, synthetic resin, and, as shown in the figure, is formed in a substantially bowl shape that is open to the back side (substantially right side in FIG. 7A). The airbag cover 16 has, at the center on the front side thereof, the recess 16A for accommodating the above-described ornamental member 40 and a hole 16AH into which the attachment bolt 40A of the ornamental member 40 can be inserted. The recess 16A is formed such that the surface of the ornamental member 40 disposed inside the recess 16A is substantially flush with the surface of the airbag cover 16.

Furthermore, the airbag cover 16 has groove-like tear lines (L1 to L4, and LC) formed in the inner surface on the back side thereof (see FIG. 7B) so as to be split, leaving the recess 16A fixed by the connecting member 20, during inflation and deployment of the airbag 10. That is, the airbag cover 16 has the tear lines on the back surface thereof, including the circular tear line LC formed around the recess 16A and a plurality of (herein, four) tear lines L1 to L4 extending radially from the tear line LC, so that it can be split into a plurality of (herein, four) covering pieces 16B, leaving the recess 16A, when subjected to an inflation pressure from the airbag 10.

In addition, these covering pieces 16B have integrally formed attachment tabs 16C, which protrude toward the back side, so as to correspond to the airbag cover attachment tabs 24A of the base plate 24 (see FIG. 3). By fastening them to each other with rivets, the covering pieces 16B are fixed to the base plate 24. Thus, the airbag cover 16, with the covering pieces 16B being fixed to the base plate 24, can be split and independently opened. That is, when the inflator 30 is activated to inflate and deploy the airbag 10 with the gas pressure, the airbag cover 16 is pressed and split at the tear line LC portion around the ornamental member 40 (recess 16A) by this force. At the same time, the other tear lines L1 to L4 are also pressed and split. The split covering pieces 16B open toward the outside so as to pivot about the portions fixed to the base plate 24, leaving the recess 16A, and are completely separated and independently opened.

FIG. 8 is a front view of the airbag cover 16 with the covering pieces 16B open, viewed from front (the occupant side). The structures other than the covering pieces 16B and the base plate 24 are omitted.

As shown in the figure, when the airbag 10 is inflated, the airbag cover 16 is split into the covering pieces 16B and opens radially. Thus, after the airbag 10 is inflated toward the front side and passes between the covering pieces 16B, the airbag cover 16 does not block the inflation and deployment of the airbag 10 in the front side direction and side surface direction.

Next, the airbag 10 accommodated between the airbag cover 16 and the base plate 24 (see FIG. 2) will be described.

Figure 9A:
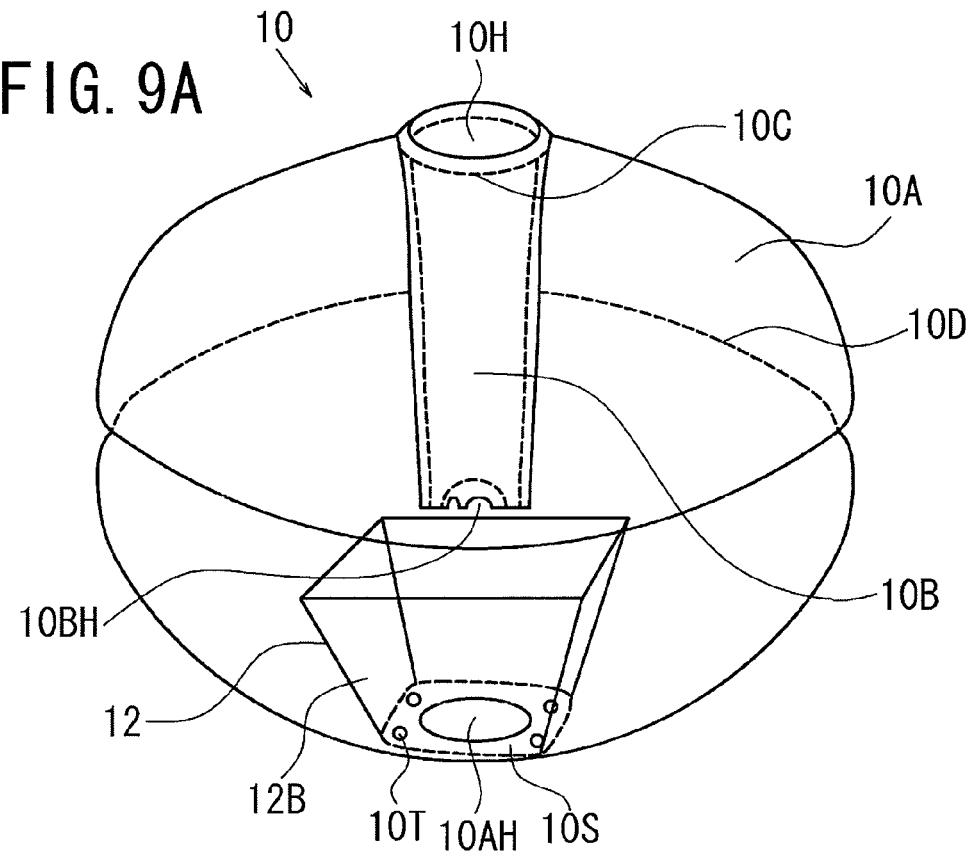
FIG. 9 is a schematic view showing the airbag in an extracted state.
Figure 9B:
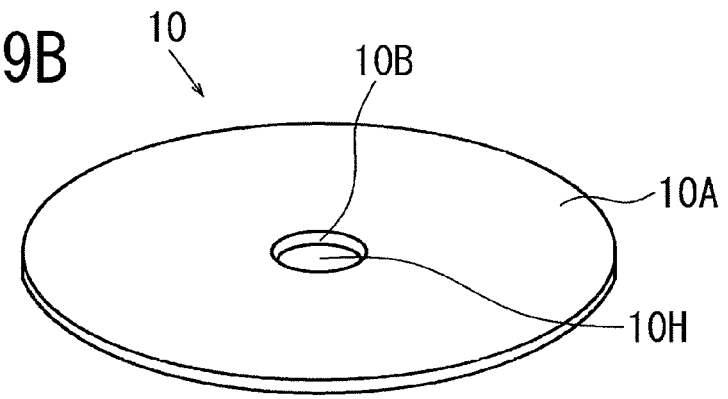

FIG. 9 is a schematic view showing the airbag 10 in an extracted state, in which FIG. 9A is a perspective view showing the inside of the airbag 10 in an inflated and deployed state, viewed from front. FIG. 9B is a perspective view of the airbag 10 in a non-inflated state, viewed from front.

In FIG. 9, the ornamental member 40, the connecting member 20 connected to the ornamental member 40, the inflator 30, and the like that are disposed in the tubular tether belt 10B are not shown.

As has been described above, the airbag 10 according to this embodiment includes the airbag body 10A and the tubular tether belt 10B that are connected to each other at the sewn portion 10C. As shown in FIG. 9A, when the airbag body 10A is inflated and deployed, the tubular tether belt 10B is disposed so as to extend substantially linearly inside the airbag body 10A, from the front surface toward the back side (in FIG. 9A, from the upper surface toward the lower side).

The airbag body 10A is formed in a bag shape that can be inflated and deployed in a substantially flat ball shape (ellipsoidal ball shape), by, for example, sewing two substantially circular base fabrics together. More specifically, the airbag body 10A is formed by laying a front-side base fabric and a back-side base fabric, which have substantially the same size (see FIG. 9B), on top of each other, sewing the outer peripheral edges thereof together (a sewn portion 10D shown in FIG. 9A), and turning the bag inside out. Furthermore, the airbag body 10A has, at substantially the center of the front-side base fabric, a circular cutaway portion 10H into which the above-described recess 16A in the airbag cover 16 can be inserted (see FIG. 2) and, at substantially the center of the back-side base fabric, an inflator attachment hole 10AH that communicates with the inflator 30 to introduce the generated gas into the airbag 10. The inflator attachment hole 10AH has a circular shape conforming to the diameter of the inflator 30, and four small holes 10T, through which the bolts 22D of the cushion ring 22 (see FIG. 5) are inserted, are formed in a peripheral portion 10S thereof.

Furthermore, the tubular tether belt 10B is connected to the cutaway portion 10H in the airbag body 10A at one end (open end), over the entire periphery thereof. Thus, the cutaway portion 10H is closed, and the inside (inner periphery) of the tubular tether belt 10B communicates with the outside, on the front side, of the airbag 10. Thus, the airbag 10 is configured such that it can, while accommodating the ornamental member 40 (see FIG. 2) or the like in the tubular tether belt 10B, inflate and deploy toward the front side from the periphery thereof. On the other hand, the tubular tether belt 10B has, at substantially the center of the other end (closed end) (in FIG. 9A, the lower end), an attachment hole 10BH into which the attachment bolt 40A of the ornamental member 40 (see FIG. 2) can be inserted. When fixed to the above-described connecting member 20, the attachment bolt 40A of the ornamental member 40 is inserted into the attachment hole 10BH. Thus, the end of the tubular tether belt 10B is sandwiched between the airbag cover 16 and the connecting member 20.

The airbag 10 is fixed by, for example, inserting the four bolts 22D of the cushion ring 22 into the small holes 10T in the airbag body 10A from inside, threading the attachment holes 24C in the base plate 24 (see FIG. 3) onto the bolts 22D from outside (back side), and then screwing nuts onto the bolts 22D. At this time, the periphery (peripheral portion 10S) of the inflator attachment hole 10AH in the airbag 10, the connecting member 20, the holding member 14, the gas rectifying member 12, and the like, are layered in a predetermined order, are sandwiched between the cushion ring 22 and the base plate 24, and are retained (sandwiched). Among these members, the gas rectifying member 12 (see FIG. 9A) is disposed in a three-dimensional configuration in the airbag 10, such that is extends from the back-side base fabric toward the front side.

Herein, the gas rectifying member 12 (see FIG. 2) rectifies the gas from the inflator 30 during inflation and deployment of the airbag 10, adjusts the outflow direction thereof, and guides the gas in the airbag 10. The gas rectifying member 12 is disposed between the airbag 10, which is accommodated in a folded state in the device, and the inflator 30. In this embodiment, the gas rectifying member 12 rectifies and guides the gas generated by the inflator 30 mainly to the vicinity of a portion in the airbag 10, which needs to be inflated at the initial stage of deployment (an inner surface portion that is deployed from a planned cut portion 14H of the holding member 14 (see FIG. 13), described below). Thus, the deployment characteristics of the airbag 10 are improved to enhance the occupant protection function. Furthermore, herein, in the airbag 10, the gas rectifying member 12 also functions as an airbag protection member that protects the airbag 10 from the heat produced by the gas generated by the inflator 30 or the impact of the gas pressure.

Figure 10:
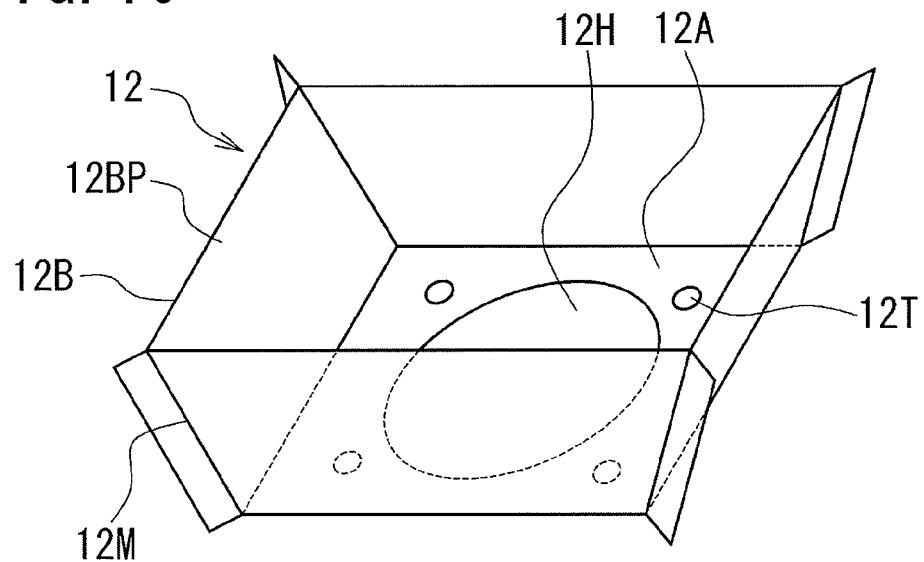
FIG. 10 is a perspective view of a gas rectifying member, viewed from front.
Figure 11:
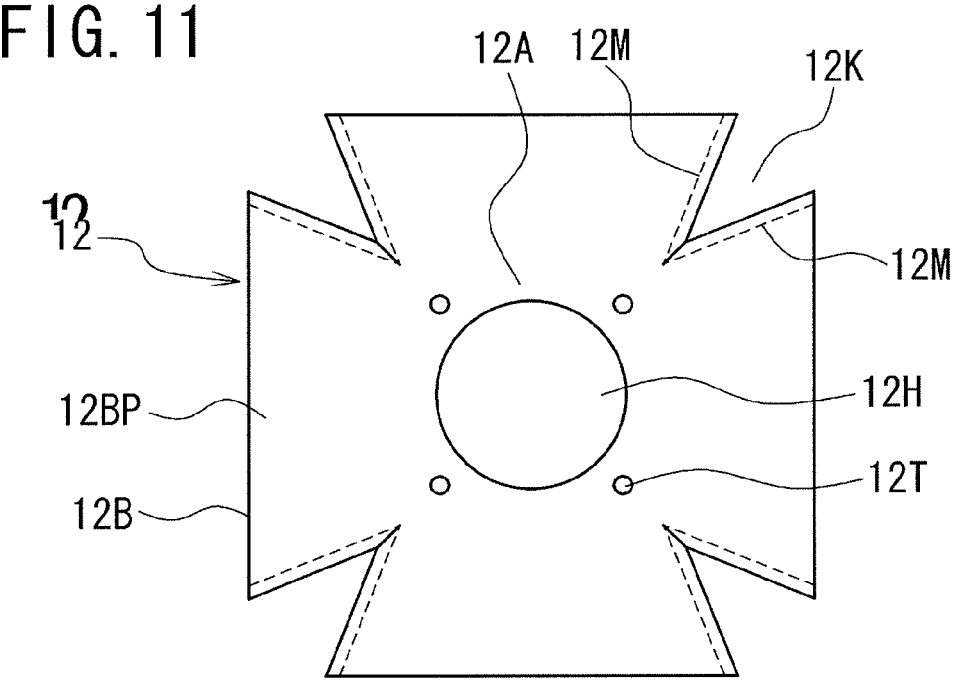
FIG. 11 is a plan view showing the gas rectifying member shown in FIG. 10 in an unassembled state (developed shape).

FIG. 10 is a perspective view of the gas rectifying member 12, viewed from front, in which a state before being disposed in the airbag 10 is schematically shown. Furthermore, FIG. 11 is a plan view of the gas rectifying member 12 in an unassembled state (developed shape).

As shown in FIG. 10, the gas rectifying member 12 includes a retained portion 12A sandwiched and retained, together with the airbag 10, between the cushion ring 22 and the base plate 24 (herein, between the airbag 10 and the cushion ring 22), and a free-standing tubular gas-flow guide portion 12B standing upright from the retained portion 12A in a retained state.

Herein, the gas rectifying member 12, as a whole, is formed in a substantially box shape with the front side (in FIG. 10, the upper side) open. The retained portion 12A and standing surfaces of the gas-flow guide portion 12B are substantially rectangular and are formed as a single part from, for example, a woven base fabric the same as the airbag 10. Furthermore, the retained portion 12A has, at the center thereof, an insertion hole 12H having substantially the same size as the inflator attachment hole 10AH in the airbag 10 and, near the corners around the insertion hole 12H, four small holes 12T into which the bolts 22D of the cushion ring 22 (see FIG. 5) can be inserted.

When the retained portion 12A of the gas rectifying member 12 is laid on the peripheral portion 10S of the inflator attachment hole 10AH in the airbag body 10A (see FIG. 9A), the inflator 30 is inserted into the insertion hole 12H. On the other hand, the bolts 22D of the cushion ring 22 are inserted into the small holes 12T formed around the insertion hole 12H, from the front side to the back side (in FIG. 10, from the upper side to the lower side). In this state, the substantially rectangular cushion ring 22 is accommodated in the bottom portion of the gas-flow guide portion 12B so as to cover the retained portion 12A and sandwiches the retained portion 12A, similarly to the airbag body 10A, between itself and the base plate 24.

Furthermore, in this embodiment, the gas rectifying member 12 is formed of a silicone coated base fabric that is coated with silicone coating agent, such as silicone rubber or silicone resin, and is formed in a three-dimensional shape from a single base fabric. That is, as shown in FIG. 11, the insertion hole 12H is formed at the center of the base fabric, and the retained portion 12A is provided at the center of the base fabric. The tubular gas-flow guide portion 12B is formed by providing radial cutout portions on the outside of the retained portion 12A (at the peripheral portion) and by connecting side edges (edges) of each cutout portion 12K together.

More specifically, herein, a plurality of (herein, four) cutout portions are formed such that they gradually narrow from the edges (herein, four corners) of the substantially rectangular base fabric toward the center of the insertion hole 12H. Thus, four substantially wedge-shaped, radial cutout portions 12K are formed substantially symmetrically every 90 degrees. The edges of the cutout portions 12K are laid on each other and are connected together from the outside at a position a predetermined distance away from the edges (herein, the side edges are linearly sewn and connected at sewn portions 12M). Thus, gas-flow guide portion pieces 12BP formed between the four cutout portions 12K are made to stand upright toward one side (see FIG. 10), forming the gas-flow guide portion 12B in a tubular shape (herein, a square-tubular shape).

The gas rectifying member 12 is formed such that the diagonal line length of the rectangle, in the developed shape (see FIG. 11), is, for example, equal to or larger than three times the diameter of the insertion hole 12H. Furthermore, the gas rectifying member 12 is formed such that, in a state in which the tubular gas-flow guide portion 12B is standing (a state before being disposed in the airbag 10, shown in FIG. 10), it gradually expands from one end at the retained portion 12A (base end) toward the other end (tip end), that is, such that the peripheral length (the length at sections at various positions in the height direction) gradually increases toward the aforementioned direction. Furthermore, the gas-flow guide portion 12B of the gas rectifying member 12 is formed such that, in a state in which it is standing as above, the peripheral length thereof is larger than the inside diameter of the inner periphery (as will be described below, the inside portion on which the gas-flow guide portion 12B is disposed) of the above-described airbag 10 in a folded state (see FIG. 2), that is, formed in a tubular shape that can be expanded to a larger size than the region thereof.

In addition, herein, although only one gas rectifying member 12 is disposed, a plurality of (two or more) rectifying members 12 may be used in a stacked manner. The gas rectifying member 12 is formed such that, for example, the coated surface serves as the inner surface of the gas-flow guide portion 12B disposed to oppose the inflator 30, so that the surface coated with the coating agent is subjected to the gas from the inflator 30.

As has been described above, the gas-flow guide portion 12B is formed in a three-dimensional shape such that it extends from the retained portion 12A in the deploying direction of the airbag 10 (see FIG. 9A). The gas rectifying member 12 is disposed at the above-described predetermined position in the airbag 10 before the airbag 10 is folded, and, mainly in a state in which it is standing (see FIG. 10), is folded together with the airbag 10. At this time, the airbag 10, from a state in which substantially the overall length is extended in the extending direction thereof (in FIG. 9A, upward), is folded in an accordion shape so as to be compressed downward and is accommodated in the airbag cover 16 (see FIG. 2). In this accommodated state, not only the airbag body 10A of the airbag 10, but also the tubular tether belt 10B, is folded in an accordion shape in the longitudinal direction of the tubular shape and is accommodated in the airbag cover 16. Next, a process of folding the airbag 10, and the like, will be described. The airbag 10 is folded in an accordion shape by a dedicated folding device.

FIG. 12 is a conceptual diagram schematically showing a process of folding the airbag 10 using this airbag folding device, viewed from a side of the folding device, in which folding steps are shown in sequence.

Figure 12A:
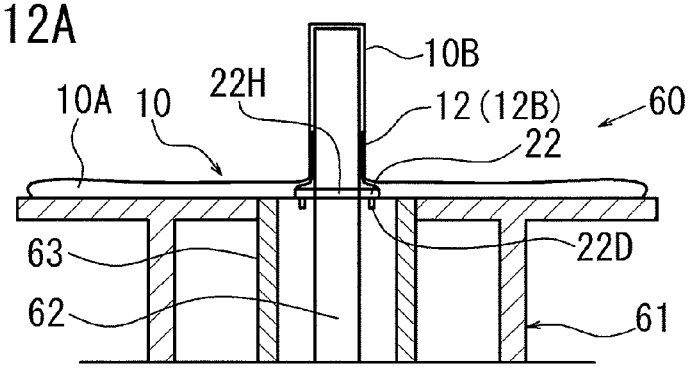
FIG. 12 is a conceptual diagram schematically showing a process of folding the airbag using an airbag folding device according to this embodiment.
Figure 12B:
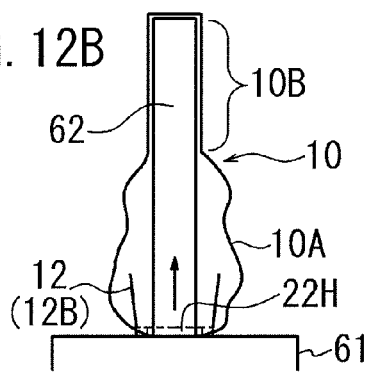
Figure 12C:
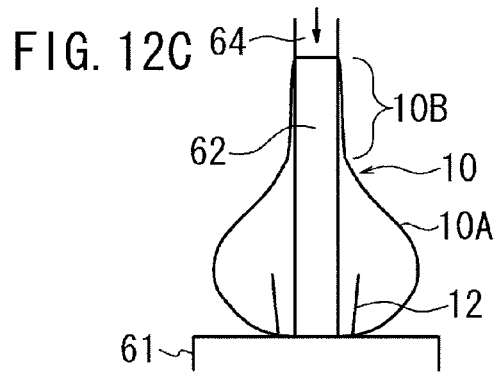
Figure 12D:
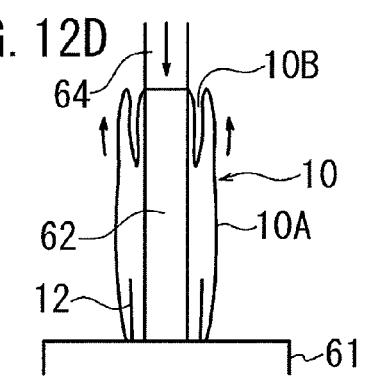
Figure 12E:
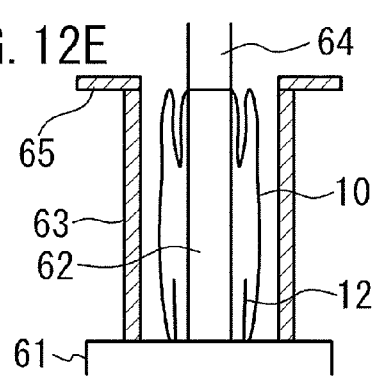
Figure 12F:
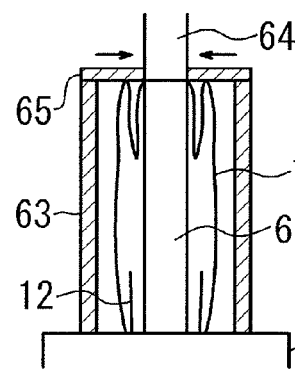
Figure 12G:
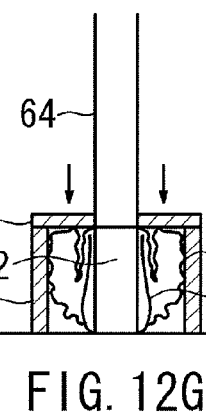
Figure 12H:
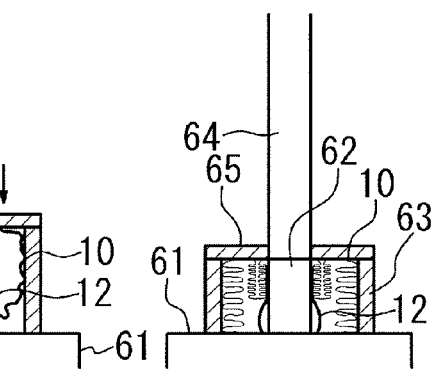

As shown in FIG. 12A, an airbag folding device 60 includes a table 61 having a substantially horizontal top surface, a column-shaped supporting member 62 for supporting the tubular tether belt 10B, a cylindrical outer cylinder 63 for accommodating the airbag 10, which is disposed on the outside of the supporting member 62, the supporting member 62 and the outer cylinder 63 being disposed concentrically with each other substantially at the center of the table 61, and a column-shaped sandwiching member 64 disposed vertically above the supporting member 62 (see FIG. 12C).

The supporting member 62 and the outer cylinder 63 are supported by the table 61 so as to be vertically movable and are independently raised and lowered by being driven by driving mechanisms, such as piston-and-cylinder mechanisms (not shown). Furthermore, because the supporting member 62 has an outside diameter that is smaller than the insertion hole 22H in the cushion ring 22 (see FIG. 5), it can be inserted through the insertion hole 22H and can be moved vertically, as will be described below. On the other hand, the sandwiching member 64 sandwiches one end (a free end, i.e., the above-described closed end) of the tubular tether belt 10B between itself and the supporting member 62. The sandwiching member 64 is formed to have the same outside diameter as the supporting member 62 and is supported by a support means (not shown) disposed thereabove, so as to be vertically movable. The sandwiching member 64 is raised and lowered by being driven by a driving mechanism (not shown).

When folding the airbag 10 using the airbag folding device 60, first, the peripheral portion 10S of the airbag (see FIG. 9A) is disposed on the center of the table 61 (above the supporting member 62) (see FIG. 12A). Then, the bolts 22D of the cushion ring 22 are inserted into the four small holes 10T formed at the peripheral portion 10S. At this time, the gas rectifying member 12 is disposed between the airbag 10 and the cushion ring 22 in such a manner that the tubular gas-flow guide portion 12B stands upright in a self-supported manner (see FIG. 10). The cushion ring 22 is disposed so as to be accommodated therein, and the bolts 22D are inserted into the four small holes 12T, so that the retained portion 12A of the gas rectifying member 12 is sandwiched between the cushion ring 22 and the airbag 10. In this state, the bolts 22D of the cushion ring 22 are inserted into and engaged with the four holes in the top surface of the table 61, formed on the outer peripheral side of the supporting member 62, thereby fixing the cushion ring 22 to the aforementioned position.

Next, an end of the supporting member 62 is raised through the insertion hole 22H in the cushion ring 22 and is inserted into the tubular tether belt 10B, so that the tubular tether belt 10B is disposed such that the overall length thereof is extended upward (tubular shape). Furthermore, the airbag body 10A connected to the tubular tether belt 10B is placed flat on the table 61, in a substantially circular shape, around the supporting member 62. Then, the supporting member 62 is further raised (see FIG. 12B) to push the tubular tether belt 10B upward. Subsequently, the airbag body 10A is pushed upward so that the airbag 10 is disposed such that substantially the overall length is extended.

The airbag 10 according to this embodiment is formed such that, in this state, the tubular tether belt 10B has substantially the same length as the front-side base fabric and back-side base fabric of the airbag body 10A in an extended state, in other words, the length of the tubular tether belt 10B is substantially half the length of the airbag body 10A in an extended state. Therefore, the supporting member 62 can be raised up to a height position about three times the length of the tubular tether belt 10B from the top surface of the table 61. Herein, the supporting member 62 is raised to the vicinity of the maximum height position and is stopped. Thereafter, a projected portion (not shown) formed on the end surface of the supporting member 62 is inserted into the attachment hole 10BH in the tubular tether belt 10B (see FIG. 9A) by hand. Thus, the end of the tubular tether belt 10B (herein, upper end) is positioned.

Next, the sandwiching member 64 is lowered (see FIG. 12C) to sandwich the end of the tubular tether belt 10B between itself and the supporting member 62. While keeping this state, the supporting member 62 and the sandwiching member 64 are synchronously lowered. Then, from this state, when the supporting member 62 and the sandwiching member 64 are lowered to a position substantially half the length of the tubular tether belt 10B (see FIG. 12D), the lowering operation is stopped. Then, outside portions of the airbag body 10A are pulled upward by hand. Thus, the tubular tether belt 10B is folded substantially at an intermediate position and is disposed so as to be layered on the outside of the supporting member 62.

Next, the outer cylinder 63 (see FIG. 12E) is raised from the top surface of the table 61 to the vicinity of the upper end (sandwich position) of the tubular tether belt 10B so as to accommodate the entirety of the airbag 10 between the outer cylinder 63 and the supporting member 62. Then, a pair of plates 65, which have symmetric semi-circular cutout portions (openings) formed at positions opposed to each other, are moved from both sides of the outer cylinder 63 toward the sandwiching member 64 and are moved toward each other while sliding on the upper end of the outer cylinder 63 (see FIG. 12F). Thus, the cutout portions of the plates 65 are fitted to fit grooves (not shown) provided on the lower end side of the sandwiching member 64 to close the opening in the upper end of the outer cylinder 63.

From this state, the airbag folding device 60 synchronously lowers the supporting member 62, the sandwiching member 64, the outer cylinder 63, and the plates 65 (see FIG. 12G) to push the airbag 10 downward and fold (toward the table 61). At this time, the folded tubular tether belt 10B, in a layered state, is compressed together with the airbag body 10A, and the airbag 10 is folded in an accordion shape such that the respective portions are folded and compressed downward between the plates 65 and the top surface of the table 61. After the entirety of the airbag 10 is compressed to a predetermined state and is folded in this manner (see FIG. 12H), the pair of plates 65 are removed. Then, the supporting member 62 and the outer cylinder 63 are lowered while the sandwiching member 64 is raised. By returning them to the original positions before the operation (stand-by position), the folding operation of the airbag 10 is completed.

Note that the way of operation of the airbag folding device 60 is appropriately changed in accordance with the size, shape, and the like of the airbag 10 to be folded. The operation positions of the respective parts of the device, such as the position where the supporting member 62 and the outer cylinder 63 are raised and stopped and the position where the supporting member 62 and the sandwiching member 64 are lowered and stopped, are set in accordance with the length by which the airbag 10 and the tubular tether belt 10B can be extended. Furthermore, the folded airbag 10 is substantially entirely covered and held by the holding member 14 so as to be wrapped from the outside, so that the folded shape is not destroyed (see FIG. 2).

Figure 13A:
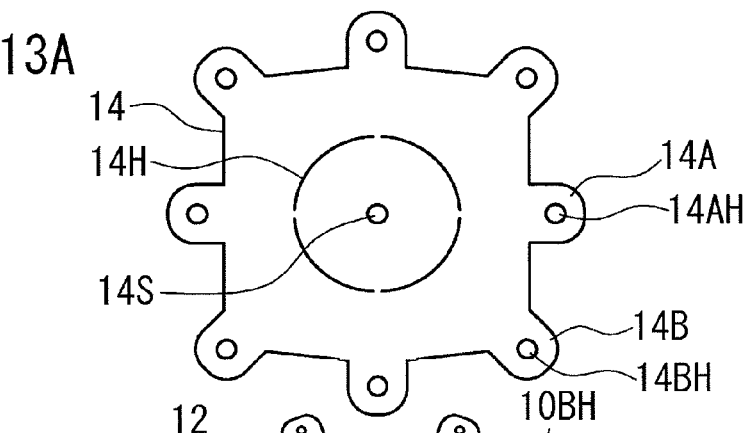
FIG. 13 is a schematic view showing a holding member, the airbag covered with the holding member, etc.

FIG. 13 is a schematic view showing the holding member 14, the airbag 10 covered with the holding member 14, etc., in which FIG. 13A is a developed plan view of the holding member 14 before covering the airbag 10.

The holding member 14 is formed of, for example, a base fabric the same as the gas rectifying member 12. As shown in the figure, the holding member 14 has a substantially square shape and has a circular insertion hole 14S formed at the center thereof. When the airbag 10 covered with the holding member 14 is accommodated in the airbag cover 16 (see FIG. 2), the attachment bolt 40A of the ornamental member 40 is inserted into the insertion hole 14S. In this state, the periphery of the insertion hole 14S in the holding member 14 is retained by being sandwiched between the connecting member 20 and the back surface of the airbag cover 16 (recess 16A).

Furthermore, the holding member 14 has a substantially circular planned cut portion 14H, which is a perforation line, formed concentrically around the insertion hole 14S. The planned cut portion 14H is a weakened portion that allows the holding member 14 to be easily cut at the initial stage of inflation and deployment of the airbag 10 and has a diameter sufficient to allow the recess 16A of the airbag cover 16 and the ornamental member 40 to pass therethrough. As has been described above, the inside portion of the planned cut portion 14H is retained by the recess 16A and the connecting member 20. Furthermore, the holding member 14 has, in total, eight radially outwardly projecting attachment tabs, namely, four attachment tabs 14A formed at middle portions of the four sides and four attachment tabs 14B formed at the corners on the diagonal lines. The attachment tabs 14A each have a hole 14AH and the attachment tabs 14b each have a hole 14BH, through which the bolts 22D of the cushion ring 22 can be inserted.

Figure 13B:
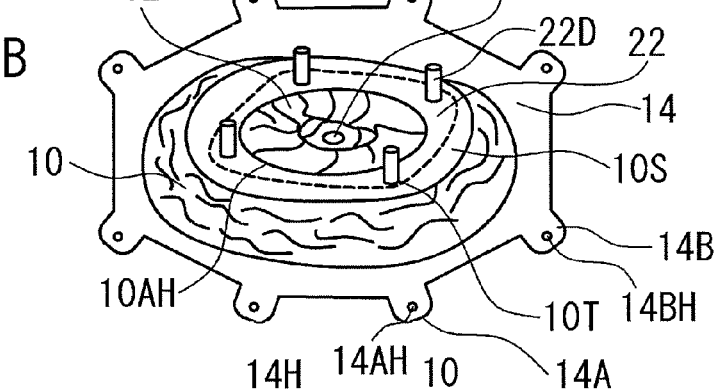

FIG. 13B is a perspective view of the holding member 14 before covering the airbag 10 and the airbag 10 having been folded in the above-described manner and removed from the airbag folding device 60, viewed from back.

As shown in the figure, the bolts 22D of the cushion ring 22, which have been inserted before the airbag 10 is folded, project from the peripheral portion 10S of the inflator attachment hole 10AH, from the back side of the folded airbag 10.

When the airbag 10 is covered with the holding member 14, first, the folded airbag 10 is placed substantially at the center of the holding member 14. Then, the attachment hole 10BH in the tubular tether belt 10B (see FIG. 9A) and the insertion hole 14S in the holding member 14 are arranged in a manner such that their centers are aligned. Then, the holes 14AH in the attachment tabs 14A formed at middle portions of the four sides of the holding member 14 are each threaded onto the corresponding one of the four bolts 22D of the cushion ring 22 projecting from the back side of the airbag 10. Next, two of the holes 14BH in the four attachment tabs 14B formed on the diagonal lines of the holding member 14 are threaded onto one bolt 22D of the cushion ring 22, and the remaining two are threaded onto the bolt 22D located at the diagonal position. Thus, the airbag 10 is covered with the holding member 14.

Figure 13C:
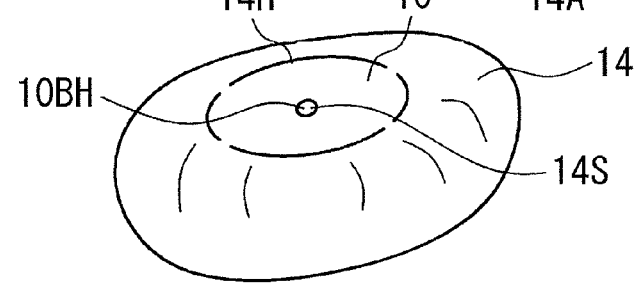

FIG. 13C is a perspective view of the airbag 10 covered with the holding member 14 in this manner, viewed from front.

By operating as above, as shown in the figure, substantially the entirely of the airbag 10 is uniformly covered and wrapped with the holding member 14 from the front side. As a result, the outer peripheral surface of the airbag 10 is held by a portion between the above-described attachment tabs 14A and 14B of the holding member 14 and the planned cut portion 14H. Thus, inflation and deployment in the side surface direction, due to the gas from the inflator 30, is suppressed at least at the initial stage of deployment.

Figure 13D:
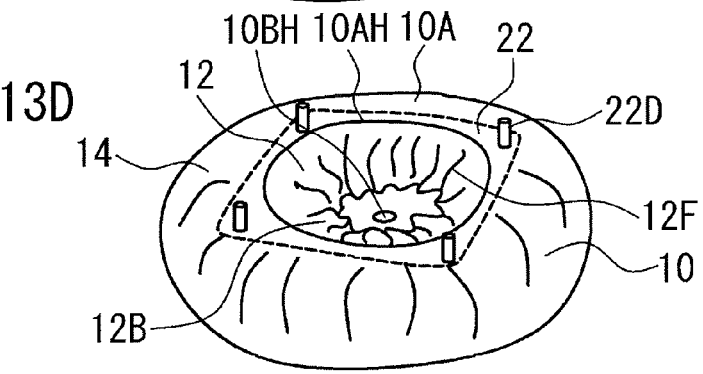

On the other hand, FIG. 13D is a perspective view of the airbag 10 and the holding member 14 shown in FIG. 13C, viewed from back.

When the airbag 10 is folded, a part of the gas-flow guide portion 12B (see FIG. 10) of the gas rectifying member 12 disposed in the airbag 10 is sometimes sandwiched between the folded airbag 10 and is folded in an accordion shape. In such a case, subsequently to the operation of covering the airbag 10 with the holding member 14, the sandwiched portion of the gas rectifying member 12 (gas-flow guide portion 12B) is pulled out from between the airbag 10, and, as shown in the figure, is disposed at a predetermined position along the inside (inner periphery) of the folded airbag 10 (see FIG. 2).

This makes the gas-flow guide portion 12B of the gas rectifying member 12 fully exhibit the function to rectify and guide the gas flow.

As has been described above, herein, in this embodiment, the gas-flow guide portion 12B of the gas rectifying member (see FIG. 10) is formed in a free-standing tubular shape. This makes it relatively easy to perform operations to pull the gas-flow guide portion 12B out from between the airbag 10 and to dispose it. That is, herein, the airbag 10 is folded (see FIG. 12) after the retained portion 12A of the gas rectifying member 12 is retained by the cushion ring 22. Therefore, the gas rectifying member 12 is disposed in a three-dimensional manner such that the gas-flow guide portion 12B extends from the retained portion 12A toward a direction in which the airbag 10 is deployed (extended direction). When the airbag 10 is folded, the gas-flow guide portion 12B stands along the supporting member 62 and becomes independent of the airbag body 10A etc., surrounding the gas-flow guide portion 12B. Accordingly, in this gas rectifying member 12, when the airbag 10 is folded, the gas-flow guide portion 12B is less likely to follow the airbag 10 and, hence, is less likely to be sandwiched between the folded and compressed airbag 10.

Furthermore, even when the gas-flow guide portion 12B is partially sandwiched, because the shape thereof is tubular, a portion other than the sandwiched portion of the gas-flow guide portion 12B (hereinafter referred to as a "sandwiched portion") is pulled toward the sandwiched portion, and a force in this direction acts on the gas-flow guide portion 12B. As a result, the gas-flow guide portion 12B is deformed or displaced toward the sandwiched portion, causing, for example, the side opposite the sandwiched portion to move toward the supporting member 62 or both sides (for example, the corners on both sides of the sandwiched portion of the gas-flow guide portion 12B) of the sandwiched portion to move toward each other and moving the vicinity thereof toward the supporting member 62. Thus, a part or the entirety of the gas-flow guide portion 12B, except for the sandwiched portion, is displaced in a direction away from the airbag 10 to be folded.

Therefore, in this gas rectifying member 12, a portion that is not or less likely to be sandwiched between the airbag 10 is created in the gas-flow guide portion 12B other than the sandwiched portion. Thus, even when the gas-flow guide portion 12B is partially sandwiched, the entirety thereof is not sandwiched. Accordingly, in this gas rectifying member 12, at least a part of the gas-flow guide portion 12B remains protruded toward the inner peripheral side of the airbag 10, without being sandwiched between the folded airbag 10. By pulling the sandwiched gas-flow guide portion 12B out from between the airbag 10 from that portion, even if the airbag 10 is held in a compressed manner by the holding member 14, the entirety of the gas-flow guide portion 12B can be easily pulled out of the airbag 10 (inner peripheral side).

The gas rectifying member 12 having been pulled out in this manner is disposed such that the gas-flow guide portion 12B extends along the inner wall of the airbag 10, from the inflator attachment hole 10AH to the vicinity of the front end of the inner periphery (in FIG. 2, the left end), i.e., the vicinity of a portion where the airbag 10 is inflated at the initial stage of deployment. Furthermore, as has been described above, this gas-flow guide portion 12B is formed in a tubular shape that can be expanded to a larger size than the inside portion (inner periphery) of the folded airbag 10. Therefore, the gas-flow guide portion 12B disposed in the airbag 10 is entirely slack (see FIG. 13D) and is disposed on the inner peripheral surface (inner wall) of the airbag 10 so as to be folded, and a plurality of pleats (wrinkles) 12F are formed.

On the other hand, when the airbag 10 is accommodated in the airbag cover 16 (see FIG. 2), the gas rectifying member 12 is disposed such that the gas-flow guide portion 12B surrounds the inflator 30, between the airbag 10 on the outer surface side thereof and the inflator 30. Furthermore, the gas-flow guide portion 12B extends toward the front side (in FIG. 2, toward the left side) along the inner wall of the folded airbag 10, from the cushion ring 22 that retains the retained portion 12A to the vicinity of the end of the folded tubular tether belt 10B, which is a portion inflated at the initial stage of deployment of the airbag 10 (herein, the vicinity of the sewn portion 10C on the front side). Thus, the gas rectifying member 12 protects the airbag 10 from the gas generated by the inflator 30 during inflation and deployment of the airbag 10, rectifies the gas in the airbag 10, and guides the gas toward the front side to inflate and deploy the airbag 10 in that direction.

Because the gas-flow guide portion 12B of the gas rectifying member 12 is folded and has the pleats 12F on the surface, it can achieve a performance equivalent to, for example, a plurality of heat-proof protection fabrics layered on top of one another, even though it is formed of a single base fabric. Therefore, the gas rectifying member 12 exhibits an excellent function as a protection member that protects the airbag 10 around the inflator 30 from the heat associated with generation of gas and the impact of gas pressure. Furthermore, from the standpoint of appropriately guiding the gas in the airbag 10, it is desirable that the gas-flow guide portion 12B of the gas rectifying member 12, when disposed in the folded airbag 10, have a length sufficient to reach the vicinity of a portion inflated at the initial stage of deployment of the airbag 10 and, for example, it is desirable that it have a length sufficient to reach the front end of the folded tubular tether belt 10B.

Next, an assembly process of the thus-structured airbag device 1 will be described.

When assembled, the airbag 10 folded and covered with the holding member 14 (see FIG. 13) is accommodated in the airbag cover 16 (see FIG. 2) such that the attachment hole 10BH in the tubular tether belt 10B, the insertion hole 14S in the holding member 14, and the hole 16AH in the airbag cover 16 (see FIG. 7) are aligned. Then, the connecting member 20 (see FIG. 4) is inserted into the airbag 10 such that the connecting hole 20H in the central portion 20A and the attachment hole 10BH in the tubular tether belt 10B are aligned. At the same time, the bolts 22D projecting from the recesses 22C (see FIG. 5) of the cushion ring 22 in the airbag 10 are inserted into the attachment holes 20D in the attachment feet 20C of the connecting member 20, and the attachment feet 20C are fitted to the recesses 22C with the protection member 70 (see FIG. 6) etc., therebetween.

In this state, the attachment bolt 40A (see FIG. 2) of the ornamental member 40 is inserted, from the front side, into the hole 16AH provided in the recess 16A of the airbag cover 16, and the holes 14S, 10BH, and 20H that are disposed on the back side thereof in an aligned manner. Next, a nut is screwed onto the attachment bolt 40A from the back side to fix the ornamental member 40. At the same time, the periphery of the attachment hole 10BH in the tubular tether belt 10B (see FIG. 13) and the periphery of the insertion hole 14S in the holding member 14 (the inside portion of the planned cut portion 14H) are sandwiched between the back surface of the airbag cover 16 and the front surface of the connecting member 20 and are fixed.

Then, the attachment holes 24C in the base plate 24 (see FIG. 3) are threaded onto the bolts 22D of the cushion ring 22 (see FIG. 2) and are stacked, and then the base plate 24 and the airbag cover 16 are fixed by rivets, as described above. Thereafter, the inflator 30 is inserted into the hole 24H in the base plate 24, the hole 22H in the cushion ring 22, the inflator attachment hole 10AH in the airbag 10, and the like, to dispose the side having the gas discharge ports 30A in the airbag cover 16 and the airbag 10. Then, the flange portion is fitted to the bolts 22D of the cushion ring 22, and nuts are screwed onto the bolts 22D. Thus, the inflator 30 etc. are fixed. Thus, the periphery of the inflator attachment hole 10AH in the airbag 10 (see FIG. 9A) and the retained portion 12A of the gas rectifying member 12 (see FIG. 10) are together sandwiched between the cushion ring 22 and the base plate 24 and are retained. By sandwiching and fixing them, the assembly of the airbag device 1 (see FIG. 2) is completed.

Next, a deployment operation of the thus-assembled airbag device 1 will be described.

Figure 14A:
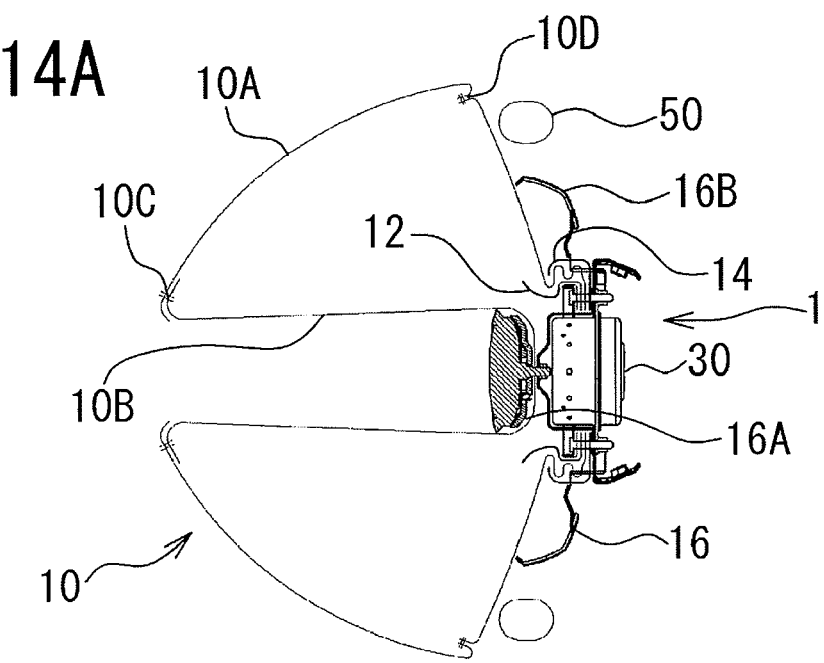
FIG. 14 is a schematic view showing a deployment operation of the airbag device according to this embodiment.
Figure 14B:
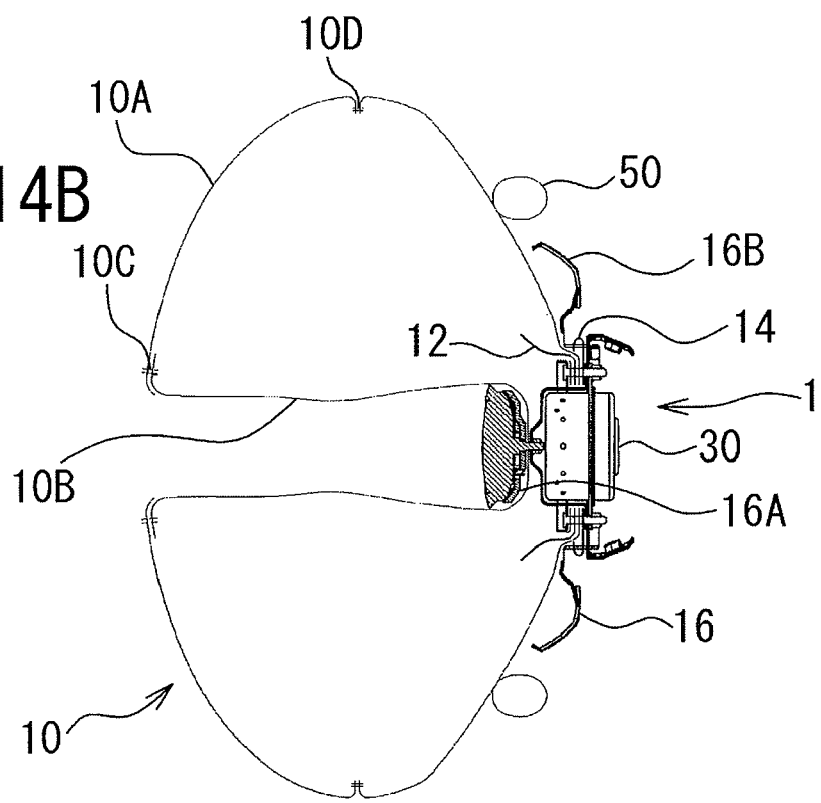

FIG. 14 is a schematic view showing a deployment operation of the airbag device 1, shown in a cross sectional view corresponding to FIG. 2. FIG. 14A shows the airbag 10 in an inflated state at the initial stage of deployment, and FIG. 14B shows an inflated state at the completion of deployment.

When the airbag device 1 detects the impact of a vehicle collision etc., the inflator 30 is ignited to generate gas, and the gas is introduced into the airbag 10. The gas is rectified by the gas rectifying member 12 and is guided toward the vicinity of the sewn portion 10C between the center of the front-side base fabric of the airbag body 10A, which begins to inflate at the initial stage of deployment of the airbag 10, and the tubular tether belt 10B. Thus, when the airbag 10 begins to inflate, the planned cut portion 14H (see FIG. 13C) of the holding member 14 is subjected to the force and is cut. At the same time, as described above, the airbag cover 16 is split along the tear lines L1 to L4, and LC, leaving the recess 16A. Thus, the covering pieces 16B open (expand) radially.

At the initial stage at which the airbag 10 begins to inflate and deploy after the airbag cover 16 is split in this manner, as shown in FIG. 14A, the airbag 10 begins to inflate and deploy from the vicinity of the sewn portion 10C of the airbag body 10A, in conjunction with introduction of gas guided inside by the gas rectifying member 12. At the same time, the airbag 10 is deployed such that the tubular tether belt 10B wraps the recess 16A etc., of the airbag cover 16, and the front side portion thereof extends toward the occupant side. At the time of inflation and deployment, because the tubular tether belt 10B is folded in the longitudinal direction in an accordion shape, it is relatively rapidly deployed toward the front side (the occupant side) with hardly any resistance at the time of extending. In contrast, the airbag body 10A is deployed toward the front side while passing through the planned cut portion 14H cut by the holding member 14 and being subjected to resistance. Therefore, the airbag body 10A is inflated while maintaining the internal pressure at a certain level and is deployed sequentially from the front side portion toward the occupant side, without destroying the folded and accommodated state in an accordion shape at the midway point.

Herein, immediately after the entirety of the tubular tether belt 10B has been completely extended (see FIG. 14A), a part of the back-side base fabric, in addition to the front side (the left side in the figure) base fabric of the airbag body 10A, is deployed outside the airbag cover 16 and is inflated and deployed toward the occupant side etc. However, in this state, sewn portion 10D of the two base fabrics of the airbag body 10A is positioned near the steering wheel 50, and other portions (undeployed portion) of the back-side base fabric is accommodated in the holding member 14. From this state, as shown in FIG. 14B, along with the progress of inflation and deployment, the sewn portion 10D of the airbag 10 moves to the substantially central position, in the longitudinal direction, of the tubular tether belt 10B, from the back side toward the front side (in the figure, from the right side toward the left side). Thus, the airbag body 10A forms a flat ball shape, and the inflation and the deployment are completed.

When inflated and deployed in this manner, the internal pressure of the airbag 10 is temporarily raised to obtain a force to split the airbag cover 16. When the internal pressure reaches a predetermined pressure, the airbag cover 16 is split. Immediately after the airbag cover 16 is split, the tubular tether belt 10B of the airbag 10 rapidly extends toward the front side due to the raised internal pressure. The airbag body 10A, following (associated with) this movement, extends in the aforementioned direction and begins to deploy. However, at the same time when the airbag body 10A begins to deploy, the capacity thereof rapidly increases. In response to this, the internal pressure drops rapidly. As a result, although the airbag body 10A tends to extend toward the front side due to the inertial force, such an extending movement is braked due to stop of extending of the tubular tether belt 10B and the resistance by the holding member 14. Thus, deployment toward the front side is temporarily stopped until the internal pressure is sufficiently raised.

Furthermore, the speed of subsequent deployment of the airbag body 10A toward the front side is lower than inflation and deployment of a portion left in the holding member 14 mainly in the side surface direction etc., because the movement of the center of the airbag body 10A is controlled by the tubular tether belt 10B. Accordingly, with the airbag device 1, the impact to occupants is reduced and the risk is greatly reduced compared with a device provided with an airbag having no tether belt. In order to accelerate the beginning of deployment of the airbag 10, it is desirable that the tear line (in particular, the tear line LC) of the airbag cover 16 (see FIG. 7B) be disposed to oppose the initial deployment portion of the airbag 10.

As has been described above, in this embodiment, at least at the initial stage of gas discharge from the inflator 30, the generated gas is rectified and guided to the vicinity of the portion of the airbag 10 which inflates at the initial stage of deployment by the gas-flow guide portion 12B of the gas rectifying member 12, and the inflation of the airbag 10 in the side surface direction is prevented by the holding member 14. Therefore, the airbag 10 can be deployed in a regulated manner in sequence from a portion that should be deployed, and the deployment characteristics of the airbag 10 can be improved. In addition, because a partially undeployed airbag is prevented from bursting out toward the occupant, the occurrence of a so-called "punching phenomenon" can be prevented. At the same time, the pressure of the gas generated by the inflator 30 expands the folded gas-flow guide portion 12B, compressing the folded airbag 10 on the outside thereof between the gas-flow guide portion 12B and the holding member 14. Because this compressing force securely maintains the airbag 10 in a folded and accommodated state, the folded state is less likely to be broken even by the impact at the initial stage of deployment. Thus, it is possible to more effectively prevent a partially undeployed airbag from bursting out toward the occupant and to more reliably prevent the occurrence of the above-mentioned punching phenomenon.

Furthermore, in the airbag device 1, the folded airbag 10 receives and absorbs the force applied to the gas rectifying member 12. Thus, the gas rectifying member 12 does not need to have an extraordinary strength, and the damage to the gas-flow guide portion 12B can be minimized. In addition, the gas rectifying member 12 can effectively protect the peripheral portion 10S of the inflator attachment hole 10AH in the airbag 10, as well as the entire inner surface of the airbag 10, from the heat, pressure, etc., associated with the generation of gas. At this time, because the gas-flow guide portion 12B of the gas rectifying member 12 has a plurality of pleats 12F (see FIG. 13D) formed by folding, it can achieve an effect equivalent to a plurality of fabrics layered on top of one another for protection. Thus, the airbag 10 can be extremely efficiently protected.

Furthermore, herein, as has been described above, at the initial stage of deployment of the airbag 10 (see FIG. 14A), the deployment of the airbag 10 during inflation and deployment toward the front side is temporarily stopped, and the sewn portion 10D thereof is positioned near the steering wheel 50 without moving toward the occupant side, until the internal pressure of the airbag 10 is raised. Therefore, even when the occupant is in an OOP (Out Of Position) state, in which the occupant is not seated in the regular seated position but in an abnormal riding position, such as when the occupant is close to or in contact with the steering wheel 50, the airbag 10 is unfailingly inflated and comes into contact with the occupant at the surface on the occupant side. Thus, the sewn portion 10D, which is the maximum diameter portion of the airbag 10, is prevented from entering the occupant's neck. In conjunction with this, the occurrence of a so-called "membrane phenomenon" caused by, for example, the airbag 10 entering the occupant's neck can be prevented. Thus, the occupant protection function of the airbag 10 can be further improved.

In addition to the above, in this embodiment, the gas-flow guide portion 12B of the gas rectifying member 12 is formed in a free-standing tubular (three-dimensional) shape. Thus, as has been described above, when the airbag 10 is folded, the gas-flow guide portion 12B is less likely to be sandwiched between the airbag 10. Furthermore, even when the gas-flow guide portion 12B is partially sandwiched between the airbag 10, because the entirety thereof is prevented from being sandwiched, the gas-flow guide portion 12B can be easily pulled out from between the folded airbag 10. Accordingly, in this embodiment, the gas rectifying member 12 of the airbag device 1 can be easily disposed at the inner periphery (inner wall) of the folded airbag 10. Thus, the effort for disposing operation, manpower, time, and the like, can be reduced to improve the operation efficiency thereof. This makes the assembly operation of the airbag device 1 easy, whereby the overall operation efficiency can be improved.

Herein, the gas rectifying member 12, including the retained portion 12A and the gas-flow guide portion 12B, is formed as a single part from the base fabric. This prevents the gas from leaking out between these portions and makes it possible to assuredly rectify and guide the gas from the inflator 30 by the gas-flow guide portion 12B. In addition, it can prevent gas leakage from disturbing the rectified gas flow. At the same time, because the inner wall of the folded airbag 10 can be assuredly covered with the extended gas-flow guide portion 12B, the airbag 10 is not directly subjected to the high-temperature, high-pressure gas from the inflator 30. Thus, the damage to the airbag 10 can be assuredly prevented.

Furthermore, in the airbag device 1, the gas-flow guide portion 12B can be formed in a three-dimensional tubular shape merely by providing the cutout portions 12K (see FIG. 11) on the outer side of a single base fabric and connecting the side edges (edges) of the cutout portions 12K together. Thus, the gas rectifying member 12 can be simply and easily fabricated, and the fabrication costs thereof can be reduced. At the same time, herein, the cutout portions 12K are connected by sewing. Therefore, a sewing thread is sewn in the lengthwise direction of the tubular shape (height direction), along the edges of the cutout portions 12K, making the gas-flow guide portion 12B in the vicinity thereof (near the sewn portions 12M) stiffer than the other portions. As a result, the gas-flow guide portion 12B is supported and is less likely to lie when, for example, the airbag 10 is folded. Thus, the gas-flow guide portion 12B is more assuredly maintained in a standing state and is less likely to be sandwiched between the airbag 10, making it easier to pull out the gas-flow guide portion 12B.

Furthermore, because the gas rectifying member 12 is formed of a silicone coated base fabric that has extremely high heat-proof characteristics, the function of the gas-flow guide portion 12B as a protection member that protects the airbag 10 from the gas can be further improved. Furthermore, because the base fabric is relatively thick and stiff, similarly to the forming of the above-described sewn portions 12M, the gas-flow guide portion 12B is less likely to be sandwiched between the folded airbag 10, and pulling out of the gas-flow guide portion 12B can be made easier.

In addition, the gas rectifying member 12 has the gas-flow guide portion 12B having a tubular shape that expands from one end at the retained portion 12A toward the other end (the tip end side). Therefore, it is possible to rectify and guide the gas flow in the airbag 10 during inflation and deployment, such that it expands toward the front side in accordance with the developed shape. That is, the airbag 10, while being inflated and deployed, is inflated such that the outside diameter thereof expands radially outward (toward the side surface). Because the end of the gas-flow guide portion 12B is expanded as to conform to the developed shape of the airbag 10, it can supply the gas into the airbag 10 along the deploying direction. As a result, the gas can be uniformly supplied into the airbag 10, and the airbag 10 can be inflated and deployed not in a locally concentrated manner but in an entirely uniform manner. Thus, the time for fully deploying the airbag 10 can be reduced and the deployment characteristics of the airbag 10 can be improved.

The gas rectifying member 12 according to this embodiment has the retained portion 12A that is formed in a substantially rectangular shape and the gas-flow guide portion 12B that is formed in a square-tubular shape. However, these portions may be formed in other shapes, for example, in the shape of the cushion ring 22, by changing the shape of the original base fabric or the number of cutout portions 12K. That is, the retained portion 12A may be formed in a shape other than a rectangular shape, for example, in a circular shape or a polygonal shape such as a triangular shape or a pentagonal shape. Similarly, the gas-flow guide portion 12B may be formed in a tubular shape other than a square-tubular shape, for example, in a cylindrical shape or a polygonal tubular shape such as a triangular tubular shape or a pentagonal tubular shape. In these cases too, the same effects and advantages as above can be obtained.

Furthermore, in this embodiment, although the tubular tether belt 10B is provided in the airbag 10, a tether belt having another shape, for example, a string-like tether belt, may be provided instead. On the other hand, the airbag 10 does not need to have a tether belt. In such a case, by holding the airbag 10, folded in an accordion shape or the like toward the occupant side and accommodated, with the holding member 14, the deployment speed of the airbag 10 toward the occupant side can be increased while reducing the occurrence of punching phenomenon. In addition, the entirety of the airbag 10 can be uniformly inflated so as to be quickly inflated and deployed in a shape capable of protecting the occupant.

The airbag 10 may be held by and accommodated in the airbag cover 16, without being held by the holding member 14. Alternatively, the airbag 10, in a state of being held by the holding member 14, may be covered with a cover member that can be split only on the front side, without being accommodated in the airbag cover 16. When the holding member 14 is omitted, however, it is desirable that the airbag cover 16 have the functions of the holding member 14. For example, a tear line having a shape corresponding to the opening formed by the planned cut portion 14H (see FIG. 13) of the holding member 14 is provided in the airbag cover 16 to control the splitting and opening on the side surface side thereof.

Furthermore, in the airbag device 1, although the inflator 30 of a so-called pyro type is inserted into and attached to the inflator attachment hole 10AH in the airbag 10, the inflator is not limited thereto. Another inflator, e.g., a high-pressure gas type inflator or a hybrid type inflator, may be used. Furthermore, not only the type of the inflator 30, but also the shape thereof and the way of disposing or attaching it to the inflator attachment hole 10AH, may be different from the above description. Regardless of such modifications, the same advantages can of course be obtained. In addition, although an airbag device for driver's seat has been described as the airbag device 1 in this embodiment, the present invention may be applied to another airbag device having the same structure, e.g., an airbag device for passenger seat.

The invention claimed is:

1. An airbag device comprising:
an inflator;
an airbag having an attachment hole for the inflator, the airbag being accommodated in a folded state around the inflator;
a gas rectifying member that guides gas from the inflator, the gas rectifying member being disposed between the inflator and the accommodated airbag;
a cushion ring disposed near the attachment hole inside the airbag; and
a base plate for fixing the airbag, the base plate being disposed to oppose the cushion ring,
wherein the gas rectifying member, during airbag assembly, includes a retained portion retained, together with the airbag, between the cushion ring and the base plate, and a free-standing tubular gas-flow guide portion standing upright from the retained portion,
wherein the retained portion and the gas-flow guide portion are formed as a single part from a base fabric,
wherein the retained portion of the gas rectifying member is provided at the center of the base fabric, and
wherein the tubular gas-flow guide portion of the gas rectifying member comprises mechanically connected side edges of radial cutout portions provided on the outside of the retained portion.

2. The airbag device according to claim 1,
wherein the side edges of the cutout portions are sewn.

3. The airbag device according to claim 2,
wherein the gas rectifying member is formed such that the tubular gas-flow guide portion, when gas is released from the inflator, can expand to a larger size than the inner periphery of the airbag in a folded state prior to the gas being released from the inflator.

4. The airbag device according to claim 2,
wherein the base fabric constituting the gas rectifying member is a silicone coated base fabric.

5. The airbag device according to claim 2,
wherein the gas rectifying member is formed such that the tubular gas-flow guide portion expands from one end at the retained portion toward the other end.

6. The airbag device according to claim 1,
wherein the gas rectifying member is formed such that the tubular gas-flow guide portion, when gas is released from the inflator, can expand to a larger size than the inner periphery of the airbag in a folded state prior to the gas being released from the inflator.

7. The airbag device according to claim 6,
wherein the base fabric constituting the gas rectifying member is a silicone coated base fabric.

8. The airbag device according to claim 6,
wherein the gas rectifying member is formed such that the tubular gas-flow guide portion expands from one end at the retained portion toward the other end.

9. The airbag device according to claim 1,
wherein the base fabric constituting the gas rectifying member is a silicone coated base fabric.

10. The airbag device according to claim 9,
wherein the gas rectifying member is formed such that the tubular gas-flow guide portion expands from one end at the retained portion toward the other end.

11. The airbag device according to claim 1,
wherein the gas rectifying member is formed such that the tubular gas-flow guide portion expands from one end at the retained portion toward the other end.

12. The airbag device according to claim 1, wherein the tubular gas-flow guide portion is in a four-sided shape.

13. The airbag device according to claim 1, wherein the tubular gas-flow guide portion is in a polygonal shape.

14. The airbag device according to claim 1, wherein the tubular gas-flow guide portion is in a cylindrical shape.

* * * * *